(12) United States Patent
Braunberger et al.

(10) Patent No.: US 10,347,145 B1
(45) Date of Patent: *Jul. 9, 2019

(54) METHOD AND APPARATUS FOR PERIODICALLY QUESTIONING A USER USING A COMPUTER SYSTEM OR OTHER DEVICE TO FACILITATE MEMORIZATION AND LEARNING OF INFORMATION

(75) Inventors: Alfred S. Braunberger, Sequim, WA (US); Beau M. Braunberger, Upland, CA (US)

(73) Assignee: Vision Works IP Corporation, Sequim, WA (US)

( * ) Notice: Subject to any disclaimer, the term of this patent is extended or adjusted under 35 U.S.C. 154(b) by 1411 days.

This patent is subject to a terminal disclaimer.

(21) Appl. No.: 12/467,119

(22) Filed: May 15, 2009

Related U.S. Application Data

(63) Continuation-in-part of application No. 10/264,581, filed on Oct. 4, 2002, now Pat. No. 7,632,101.

(60) Provisional application No. 60/327,610, filed on Oct. 5, 2001.

(51) Int. Cl.
*G09B 7/02* (2006.01)
*G09B 7/00* (2006.01)
*G09B 7/04* (2006.01)
G09B 5/00 (2006.01)
G09B 5/06 (2006.01)
G06F 13/24 (2006.01)
H04H 60/33 (2008.01)

(52) U.S. Cl.
CPC ............. *G09B 7/02* (2013.01); *G09B 7/00* (2013.01); *G09B 7/04* (2013.01); *G06F 13/24* (2013.01); *G09B 5/00* (2013.01); *G09B 5/065* (2013.01); *H04H 60/33* (2013.01); *Y10S 706/927* (2013.01)

(58) Field of Classification Search
CPC ... G09B 7/02; G09B 7/04; G09B 7/00; G09B 5/065; G09B 5/00; Y10S 706/927; G06F 13/24; H04H 60/33
USPC ............... 434/118, 255, 322, 326, 332, 350; 715/927
See application file for complete search history.

(56) References Cited

U.S. PATENT DOCUMENTS

| 1,272,553 A | 7/1918 | Spotswood |
| 1,509,371 A | 9/1924 | Nalle |
| 1,527,126 A | 2/1925 | Dodd |
| 1,678,621 A | 7/1928 | Holmes |
| 2,327,194 A | 8/1943 | Kopas |
| 2,359,460 A | 10/1944 | Barens |
| 3,172,214 A | 3/1965 | Aberge et al. |
| 3,714,721 A | 2/1973 | Tilley |
| 3,755,921 A | 9/1973 | Heller |

(Continued)

*Primary Examiner* — Jack Yip
(74) *Attorney, Agent, or Firm* — Haverstock & Owens LLP

(57) ABSTRACT

Embodiments ensure that a user performs educational tasks, such as answering predetermined test questions, on a mobile phone or other wireless electronic device. When predetermined usage limits on the mobile phone are met, application programs on the mobile phone are suspended until the user performs an educational task. In some embodiments, once the usage criteria are met, the mobile phone is able to make calls to or receive calls from only predetermined numbers. Normal use is restored only after the educational task is performed. Usage limits include a maximum number of connections (e.g., calls made and received) on the mobile phone, a maximum cost of calls, and a maximum total duration of calls, all within an allotment period.

19 Claims, 17 Drawing Sheets

(56) References Cited

U.S. PATENT DOCUMENTS

| | | |
|---|---|---|
| 3,763,576 A | 10/1973 | Sulkin |
| 3,873,095 A | 3/1975 | Nehre |
| 3,928,922 A | 12/1975 | Rosenbaum |
| 3,970,312 A | 7/1976 | Senn |
| 4,008,529 A | 2/1977 | Yorkston |
| 4,090,717 A | 5/1978 | Rossetti |
| 4,107,852 A | 8/1978 | Epstein |
| 4,156,315 A | 5/1979 | Fiore et al. |
| 4,234,933 A | 11/1980 | Adelson et al. |
| 4,257,306 A | 3/1981 | Laflamme |
| 4,345,315 A | 8/1982 | Cadotte et al. |
| 4,358,277 A | 11/1982 | Moyes et al. |
| 4,425,096 A | 1/1984 | Schwake |
| 4,509,922 A | 4/1985 | Battle |
| 4,568,086 A | 2/1986 | Krogh |
| 4,627,818 A | 12/1986 | Von Fellenberg |
| 4,650,426 A | 3/1987 | Brigance |
| 4,671,772 A | 6/1987 | Slade et al. |
| 4,682,958 A | 7/1987 | Slavik et al. |
| 4,753,597 A | 6/1988 | Pash et al. |
| 4,807,878 A | 2/1989 | Tripp |
| 4,946,391 A | 8/1990 | Hawkins et al. |
| 4,950,167 A | 8/1990 | Harris |
| 5,002,491 A | 3/1991 | Abrahamson et al. |
| 5,033,969 A | 7/1991 | Kamimura |
| 5,035,625 A | 7/1991 | Munson et al. |
| 5,055,053 A | 10/1991 | Hyman |
| 5,057,020 A | 10/1991 | Cytanovich |
| 5,059,127 A | 10/1991 | Lewis et al. |
| 5,072,385 A | 12/1991 | Rebeillard et al. |
| 5,141,439 A | 8/1992 | Cousins |
| 5,142,358 A | 8/1992 | Jason |
| 5,145,447 A | 9/1992 | Goldfarb |
| 5,161,977 A | 11/1992 | Thomas, Jr. |
| 5,183,399 A | 2/1993 | Muller |
| 5,211,563 A | 5/1993 | Naga et al. |
| 5,211,564 A | 5/1993 | Martinez et al. |
| 5,240,419 A | 8/1993 | deGyarfas |
| 5,261,823 A | 11/1993 | Kurokawa |
| 5,267,865 A | 12/1993 | Lee et al. |
| 5,273,437 A | 12/1993 | Caldwell et al. |
| 5,286,036 A | 2/1994 | Barabash |
| 5,294,229 A | 3/1994 | Hartzell et al. |
| 5,295,836 A | 3/1994 | Ryu et al. |
| 5,314,340 A | 5/1994 | Gaddis |
| 5,316,485 A | 5/1994 | Hirose |
| 5,379,213 A | 1/1995 | Derks |
| 5,407,357 A | 4/1995 | Cutler |
| 5,411,271 A | 5/1995 | Mirando |
| H1452 H | 6/1995 | Kennedy |
| 5,433,615 A | 7/1995 | Clark |
| 5,437,552 A | 8/1995 | Baer et al. |
| 5,437,553 A | 8/1995 | Collins et al. |
| 5,437,554 A | 8/1995 | Clark et al. |
| 5,449,293 A | 9/1995 | Chang et al. |
| 5,458,493 A | 10/1995 | Clark et al. |
| 5,465,982 A | 11/1995 | Rebane |
| 5,466,159 A | 11/1995 | Clark et al. |
| 5,489,213 A | 2/1996 | Makipaa |
| 5,496,177 A | 3/1996 | Collia et al. |
| 5,503,561 A | 4/1996 | Cohen |
| 5,513,993 A | 5/1996 | Lindley et al. |
| 5,531,600 A | 7/1996 | Baer et al. |
| 5,545,044 A | 8/1996 | Collins et al. |
| 5,556,283 A | 9/1996 | Stemdardo et al. |
| 5,558,521 A | 9/1996 | Clark et al. |
| 5,565,316 A | 10/1996 | Kershaw et al. |
| 5,577,919 A | 11/1996 | Collins et al. |
| 5,584,699 A | 12/1996 | Silver |
| 5,586,889 A | 12/1996 | Goodman |
| 5,615,134 A | 3/1997 | Newsham et al. |
| 5,616,033 A | 4/1997 | Kerwin |
| 5,618,182 A | 4/1997 | Thomas |
| 5,632,488 A | 5/1997 | Sturm et al. |
| 5,632,624 A | 5/1997 | Cameron et al. |
| 5,645,432 A | 7/1997 | Jessop |
| 5,667,387 A | 9/1997 | Klemm |
| 5,672,060 A | 9/1997 | Poor |
| 5,681,170 A | 10/1997 | Rieber et al. |
| 5,690,497 A | 11/1997 | Clark et al. |
| 5,700,149 A | 12/1997 | Johnson et al. |
| 5,709,551 A | 1/1998 | Clark et al. |
| 5,716,213 A | 2/1998 | Clark et al. |
| 5,716,273 A | 2/1998 | Yuen |
| 5,718,591 A | 2/1998 | Clark et al. |
| 5,721,845 A | 2/1998 | James et al. |
| 5,724,262 A | 3/1998 | Ghahramani |
| 5,725,384 A | 3/1998 | Ito et al. |
| 5,730,604 A | 3/1998 | Jay et al. |
| 5,733,128 A | 3/1998 | Getz |
| 5,735,693 A | 4/1998 | Groiss |
| 5,735,694 A | 4/1998 | Clark et al. |
| 5,738,527 A | 4/1998 | Lundberg |
| 5,743,742 A | 4/1998 | Morrel-Samuels |
| 5,743,743 A | 4/1998 | Ho et al. |
| 5,746,602 A | 5/1998 | Kikinis |
| 5,749,736 A | 5/1998 | Griswold et al. |
| 5,752,836 A | 5/1998 | Clark et al. |
| 5,769,643 A | 6/1998 | Stevens, III |
| 5,795,155 A | 8/1998 | Morrel-Samuels |
| 5,797,753 A | 8/1998 | Griswold et al. |
| 5,797,754 A | 8/1998 | Griswold et al. |
| 5,800,178 A | 9/1998 | Gillio |
| 5,800,181 A | 9/1998 | Heinlein et al. |
| 5,808,908 A | 9/1998 | Ghahramani |
| 5,810,599 A | 9/1998 | Bishop |
| 5,810,605 A | 9/1998 | Siefert |
| 5,820,386 A | 10/1998 | Sheppard, II |
| 5,822,744 A | 10/1998 | Kesel |
| 5,823,782 A | 10/1998 | Marcus et al. |
| 5,823,789 A | 10/1998 | Jay et al. |
| 5,827,070 A | 10/1998 | Kershaw et al. |
| 5,827,071 A | 10/1998 | Sorensen et al. |
| 5,839,902 A | 11/1998 | Wood |
| 5,855,483 A | 1/1999 | Collins et al. |
| 5,865,625 A | 2/1999 | Baskerville |
| 5,879,165 A | 3/1999 | Brunkow et al. |
| 5,885,087 A | 3/1999 | Thomas |
| 5,890,911 A | 4/1999 | Griswold et al. |
| 5,902,116 A | 5/1999 | Rieber et al. |
| 5,904,485 A | 5/1999 | Siefert |
| 5,907,831 A | 5/1999 | Lotvin et al. |
| 5,910,009 A | 6/1999 | Leff et al. |
| 5,933,136 A | 8/1999 | Brown |
| 5,944,530 A | 8/1999 | Ho et al. |
| 5,944,533 A | 8/1999 | Wood |
| 5,954,516 A | 9/1999 | Heinberg |
| 5,961,333 A | 10/1999 | Harrison et al. |
| 5,967,793 A | 10/1999 | Ho et al. |
| 5,978,648 A | 11/1999 | George et al. |
| 5,980,263 A | 11/1999 | Conover |
| 5,980,264 A | 11/1999 | Lundberg |
| 5,987,302 A | 11/1999 | Driscoll et al. |
| 5,991,595 A | 11/1999 | Romano et al. |
| 6,000,945 A | 12/1999 | Sanchez-Lazer et al. |
| 6,002,915 A | 12/1999 | Shimizu |
| 6,015,297 A | 1/2000 | Liberman |
| 6,018,617 A | 1/2000 | Sweitzer et al. |
| 6,018,732 A | 1/2000 | Bertrand et al. |
| 6,022,221 A | 2/2000 | Boon |
| 6,024,572 A | 2/2000 | Weyer |
| 6,024,577 A | 2/2000 | Wadahama et al. |
| 6,039,575 A | 3/2000 | L'Allier et al. |
| 6,042,384 A | 3/2000 | Loiacono |
| 6,053,741 A | 4/2000 | Wood |
| 6,064,978 A | 5/2000 | Gardner et al. |
| 6,064,998 A | 5/2000 | Zabloudil et al. |
| 6,065,972 A | 5/2000 | Doan |
| 6,074,216 A | 6/2000 | Cueto |
| 6,077,085 A | 6/2000 | Parry et al. |
| 6,086,381 A | 7/2000 | Downs et al. |
| 6,086,382 A | 7/2000 | Thomas |
| 6,093,026 A | 7/2000 | Walker et al. |
| 6,097,927 A | 8/2000 | LaDue |

(56) References Cited

U.S. PATENT DOCUMENTS

| | | |
|---|---|---|
| 6,099,320 A | 8/2000 | Papdopoulos |
| 6,112,049 A | 8/2000 | Sonnenfeld |
| 6,112,051 A | 8/2000 | De Almeida |
| 6,120,298 A | 9/2000 | Jenkins et al. |
| 6,120,299 A | 9/2000 | Trenholm et al. |
| 6,120,300 A | 9/2000 | Ho et al. |
| 6,125,358 A | 9/2000 | Hubbell et al. |
| 6,139,330 A | 10/2000 | Ho et al. |
| 6,141,528 A | 10/2000 | Remschel |
| 6,141,529 A | 10/2000 | Remschel |
| 6,144,838 A | 11/2000 | Sheehan |
| 6,146,148 A | 11/2000 | Stuppy |
| 6,148,174 A | 11/2000 | Remschel |
| 6,149,438 A | 11/2000 | Richard et al. |
| 6,149,440 A | 11/2000 | Clark et al. |
| 6,154,631 A | 11/2000 | Remschel |
| 6,155,834 A | 12/2000 | New, III |
| 6,155,838 A | 12/2000 | Hyman et al. |
| 6,155,839 A | 12/2000 | Clark et al. |
| 6,159,018 A | 12/2000 | Clark et al. |
| 6,164,974 A | 12/2000 | Carlile et al. |
| 6,164,975 A | 12/2000 | Weingarden et al. |
| 6,168,440 B1 | 1/2001 | Clark et al. |
| 6,171,112 B1 | 1/2001 | Clark et al. |
| 6,173,154 B1 | 1/2001 | Kucinski et al. |
| 6,174,237 B1 | 1/2001 | Stephenson |
| 6,178,308 B1 | 1/2001 | Bobrow et al. |
| 6,178,395 B1 | 1/2001 | Gee |
| 6,181,909 B1 | 1/2001 | Burstein et al. |
| 6,183,260 B1 | 2/2001 | Clark et al. |
| 6,183,261 B1 | 2/2001 | Clark et al. |
| 6,190,178 B1 | 2/2001 | Oh |
| 6,193,518 B1 | 2/2001 | Nocera |
| 6,193,521 B1 | 2/2001 | Clark et al. |
| 6,198,905 B1 | 3/2001 | Remschel |
| 6,201,948 B1 | 3/2001 | Cook et al. |
| 6,208,832 B1 | 3/2001 | Remschel |
| 6,234,806 B1 | 5/2001 | Trenholm et al. |
| 6,254,395 B1 | 7/2001 | Breland et al. |
| 6,257,896 B1 | 7/2001 | Fargano |
| 6,259,889 B1 | 7/2001 | LaDue |
| 6,259,890 B1 | 7/2001 | Driscoll et al. |
| 6,260,033 B1 | 7/2001 | Tatsuoka |
| 6,270,352 B1 | 8/2001 | Ditto |
| 6,280,198 B1 | 8/2001 | Calhoun et al. |
| 6,282,404 B1 | 8/2001 | Linton |
| 6,285,993 B1 | 9/2001 | Ferrell |
| 6,287,123 B1 | 9/2001 | O'Brien |
| 6,293,801 B1 | 9/2001 | Jenkins et al. |
| 6,295,439 B1 | 9/2001 | Bejar et al. |
| 6,296,487 B1 | 10/2001 | Lotecka |
| 6,299,452 B1 | 10/2001 | Wasowicz et al. |
| 6,301,571 B1 | 10/2001 | Tatsuoka |
| 6,434,591 B1 * | 8/2002 | Watakabe et al. ............. 718/103 |
| 6,438,557 B1 * | 8/2002 | Dent ............................. 712/223 |
| 6,551,104 B2 | 4/2003 | Becker |
| 6,662,023 B1 * | 12/2003 | Helle ............................ 455/558 |
| 6,678,824 B1 | 1/2004 | Cannon et al. |
| 6,743,024 B1 * | 6/2004 | Ivler et al. .................... 434/322 |
| 6,769,918 B1 | 8/2004 | God |
| 7,632,101 B2 * | 12/2009 | Braunberger et al. ......... 434/322 |
| 2002/0019227 A1 * | 2/2002 | Hurme et al. ................ 455/433 |
| 2002/0150869 A1 * | 10/2002 | Shpiro ........................... 434/156 |
| 2003/0039948 A1 * | 2/2003 | Donahue ....................... 434/322 |
| 2003/0078954 A1 * | 4/2003 | Haughey ....................... 709/102 |

* cited by examiner

| Topic | Question_No | Question | Answer | Difficulty | Hint | Asked |
|---|---|---|---|---|---|---|
| Science | 1 | Hydrogen and what other molecule combine to form water? | Oxygen | 7-2 | It Starts with the letter "O" | 0 |

| | 850 | 860 |
|---|---|---|
| 801 → | ID for mobile telephone application | 10 |
| 802 → | ID for Web browser application | 14 |
| 803 → | ID for text messenger application | 14 |
| 804 → | ID for Internet facsimile application | 18 |
| 805 → | ID for electronic mail application | 20 |
| 806 → | ID for contact/address application | 20 |
| 807 → | ID for game application | 30 |

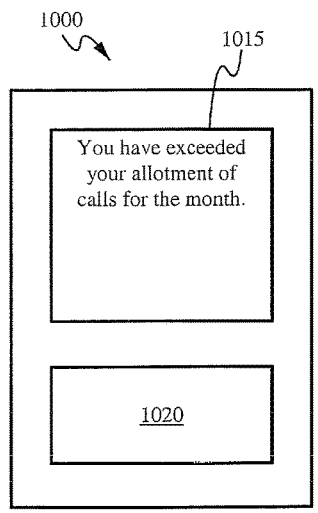
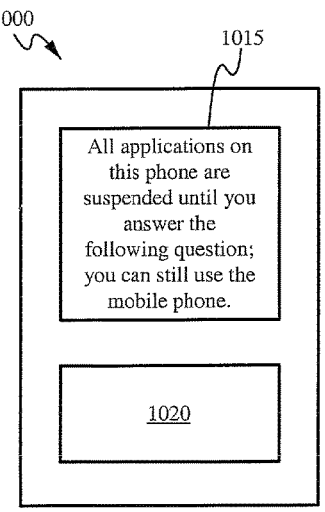
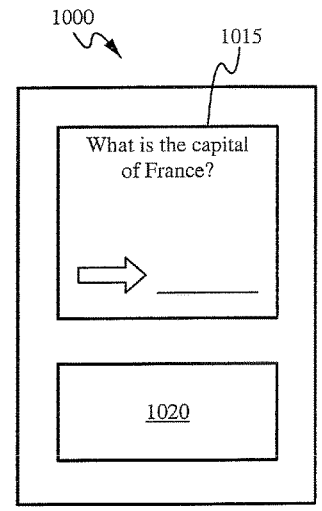
Fig. 11A    Fig. 11B    Fig. 11C
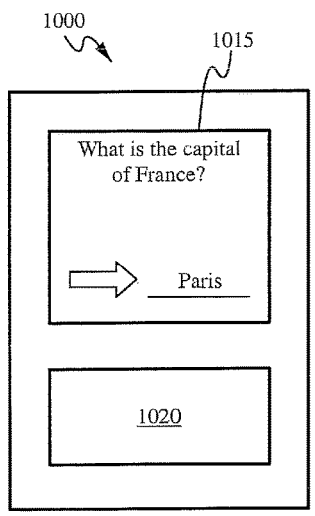
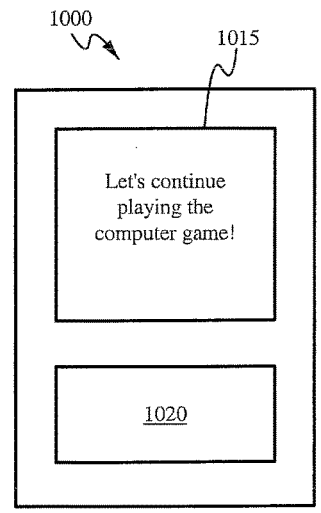
Fig. 11D    Fig. 11E

| Emergency Log | | | | 1350 |
|---|---|---|---|---|

Outgoing Calls

| Date | Time | Number | Name | Duration |
|---|---|---|---|---|
| April 10, 2009 | 11:58 pm | 408-555-1260 | Carol Smith | 2 hrs 10 min. |
| May 6, 2009 | 2:00 pm | 510-682-3619 | ? | 10 min. |
| June 9, 2009 | 4:00 pm | 650-986-3322 | Acme Towing | 5 min. |

Incoming Calls

| Date | Time | Number | Name | Duration |
|---|---|---|---|---|
| April 11, 2009 | 2:09 am | 408-555-1260 | Carol Smith | 45 min. |

Fig. 15

METHOD AND APPARATUS FOR PERIODICALLY QUESTIONING A USER USING A COMPUTER SYSTEM OR OTHER DEVICE TO FACILITATE MEMORIZATION AND LEARNING OF INFORMATION

RELATED APPLICATIONS

This application is a continuation-in-part of the U.S. patent application Ser. No. 10/264,581, filed Oct. 4, 2002, now U.S. Pat. No. 7,632,101 and titled "A Method and Apparatus for Periodically Questioning a User Using a Computer System or Other Device to Facilitate Memorization and Learning of Information," which claims priority under 35 U.S.C. § 119(e) of the U.S. provisional application Ser. No. 60/327,610, filed on Oct. 5, 2001, and titled "A Method and Apparatus for Periodically Questioning a User and Using a Computer System or Other Device to Facilitate Memorization and Learning of Information," both of which are incorporated by reference.

FIELD OF THE INVENTION

The present invention relates to educational methods and systems. More particularly, the present invention relates to educational methods and systems that suspend computer and other applications on a wireless or mobile device until a user successfully performs an educational task.

BACKGROUND OF THE INVENTION

Educators and parents are finding it more difficult to ensure that students are taking the time to study. Students have access to many types of electronic equipment that allow them unsupervised diversions. For example, students can logon to Internet chat sessions; play electronic video games on desktop computers, hand-held devices, or television sets; download and play music and videos from the Internet; watch a television program or a DVD video; or surf the World Wide Web. When a student is using a computer, watching a television set, or playing a video game, a parent can never be sure that the child is doing something educational.

Prior art systems have sought to provide educational programs on desktop computers. For example, U.S. Pat. No. 5,980,264, titled "Screen Saver," teaches a screen saver that displays questions and receives answers, testing a user's knowledge on certain topics. The screen saver is only activated on a computer that has not received input from the user for a predetermined time period. The screen saver does not require that the user answer a question correctly before he is returned to the application that was running on the computer before the screen saver was invoked.

U.S. Pat. No. 5,743,743, titled "Learning Method and System that Restricts Entertainment," to Ho et al. (Ho I), teaches a system and method that decouples peripherals from a system until an educational task has been performed. In one embodiment, Ho I teaches installing a virtual device driver that sits between a program and an actual device driver that handles I/O to a device. The virtual device driver intercepts function calls to the device driver and determines whether the running program can couple to the device. Thus, only approved programs can access the device. This system requires a virtual device driver for each device the system is coupled to. Thus, entry points to each device driver must be rewritten to determine which programs may or may not access the device.

U.S. Pat. No. 6,139,330, titled "Computer-Aided Learning System and Method," to Ho et al. (Ho II), teaches a system and method that test a user on different subjects. The system decouples a device used for entertainment—such as a speaker, a joystick, or a circuit-board that may send and receive signals. In this system, one or more devices are completely unavailable to the user while using a testing system. In one embodiment, this system disables a device driver, reenabling it only when the user performs some specified task, such as attempting to answer a question.

Both Ho I and Ho II envision testing a user when the computer is first turned on. Neither Ho I nor Ho II teaches testing a user at given time intervals or periodically, upon the occurrence of a pre-determined event. Neither Ho I nor Ho II teaches a method or system that allows the user to resume the application running before the testing system was invoked.

None of the prior art references discussed above teach a system that suspends an application program, runs an educational task—including any number of tasks or drills, such as those testing reading comprehension, general knowledge on a subject, or the pronunciation of words in a foreign language—and then efficiently resumes the application program. Accordingly, what is needed is a testing system that can periodically suspend an application program when a configurable suspension criterion is met and resume the application program when a configurable resumption criterion is met.

SUMMARY OF THE INVENTION

Embodiments of the present invention include a method and system for ensuring that a student on a host system periodically performs an educational task, such as correctly answering an educational question. One embodiment of the method comprises (a) suspending a user application based on a suspension criterion; (b) presenting on a presentation device an educational task from a set of educational tasks, such as requiring a user to correctly answer a question on a chosen subject; (c) receiving a user-generated response to the educational task on an input device; (d) repeating steps (b) and (c) until a resumption criterion is met; and (e) resuming the user application.

One embodiment of the system comprises a host system on which a user application can execute; means for suspending the user application on the host system; means for executing an interactive educational application on the host system until a resumption criterion is met; and means for resuming the user application on the host system.

In one embodiment, the system is configured so that an educational task cannot be preempted or removed. Thus, the student is required to perform the educational task before resuming the application that was running on the host system before the educational task is presented.

For both the method and system, the host system can be a personal computer; a video game player; a television set, which can be connected to a video player or a set-top box; and many other electronic devices, including those controlled by any kind of computer or processor. The user application can be a computer application; an Internet session, such as a chat session; a video game executing on a personal computer or a video game player; a television program; or a video. The suspension criterion may be that a pre-determined time interval has elapsed; that a random time interval has elapsed; or, if the host system is a television set, that the start of a television commercial has been detected. The resumption criterion may be that the user-generated response matches a correct response or that a minimum achievement level has been met. Alternatively, the resumption criterion may be that a correct passcode has been entered into the host system, allowing the user application to be resumed.

In one aspect, an electronic device is configured to ensure that a user performs an educational task before accessing one or more application programs. In some embodiments, the electronic device is a wireless device, such as a mobile phone. The wireless device comprises one or more application programs and a hardware module. The hardware module is configured to suspend the one or more application programs when a suspension criterion is met and to resume the one or more application programs when the educational task is performed on the wireless device. The suspension criterion is directly related to an amount of usage of the wireless device over a predetermined period of time, such as a week, a month, or a year.

In one embodiment, the amount of usage corresponds to an accumulated cost incurred using the wireless device, an accumulated duration of connections using the wireless device, a total number of connections using the wireless device, or any combination thereof. In some embodiments, the wireless device further comprises a calculator module programmed to determine the accumulated cost, the accumulated duration of connections, the total number of connections, or any combination thereof.

In some embodiments, the wireless device further comprises a mobile phone application program.

In one embodiment, the hardware module is configured to block connections between the mobile phone application program and one or more predetermined telephone numbers when the suspension criterion is met. In another embodiment, the hardware module is configured to allow connections only between the mobile phone application program and one or more predetermined telephone numbers when the suspension criterion is met. In still another embodiment, the hardware module is configured to allow a connection between the mobile phone application program and a remote device, when the suspension criterion is met, by entering a predetermined code on either the wireless device or the remote device.

The one or more application programs comprise a Web browser application, a text messenger application, an Internet facsimile application, an electronic mail application, a phone book application, a game application, an Internet file transfer application, or any combination thereof. In another embodiment, the one or more application programs comprise a mobile phone application program.

In one embodiment, the educational task comprises correctly answering one or more questions presented on the wireless device.

In some embodiments, the hardware module comprises a processor coupled to a computer-readable medium. The computer-readable medium contains computer-executable instructions for suspending the one or more application programs when the suspension criterion is met and for resuming the one or more application programs when the educational task is performed on the wireless device.

The wireless device further comprises a mobile phone application program, and the computer-executable instructions are also for selectively controlling connections between the mobile phone application program and a remote device when the suspension criterion is met.

In one embodiment, the one or more application programs comprise at least two application programs.

In a second aspect, a wireless device is configured to test a user on an educational task. The wireless device comprises one or more application programs, each having a corresponding numerical priority, and a hardware module. The hardware module is configured to suspend the one or more application programs based on the corresponding one or more numerical priorities when a suspension criterion is met and to resume the one or more application programs when the educational task is performed on the wireless device.

In one embodiment, the wireless device further comprises a memory structure that associates the one or more numerical priorities with the corresponding one or more application programs.

In one embodiment, the suspension criterion comprises an elapse of a predetermined period of time. In another embodiment, the suspension criterion comprises an elapse of a random period of time. In still another embodiment, the suspension criterion comprises a total cost incurred using the wireless device over a predetermined period of time exceeds a first predetermined threshold, a total duration of connections using the wireless device over a predetermined period of time exceeds a second predetermined threshold, a total number of connections using the wireless device over a predetermined period of time exceeds a third predetermined threshold, or any combination thereof.

In some embodiments, the wireless device comprises a mobile phone application program.

In one embodiment, the wireless device is configured to block calls to one or more predetermined telephone numbers when the suspension criterion is met. In another embodiment, the wireless device is configured to connect calls only to one or more predetermined telephone numbers when the suspension criterion is met.

In one embodiment, the one or more application programs comprise at least two application programs.

The wireless device further comprises an interface for changing values of the one or more numerical priorities.

In another aspect, a method ensures that a user performs an educational task before accessing one or more application programs. The method comprises suspending the one or more application programs on a wireless device when a suspension criterion is met and resuming the one or more application programs when the educational task is performed. The suspension criterion is directly related to an amount of usage of the wireless device over a predetermined period of time.

In one embodiment, the method further comprises automatically tracking on the wireless device the total cost incurred, the total duration of connections, the total number of connections, or any combination thereof. Alternatively, the method further comprises automatically retrieving from a remote host the total cost incurred, the total duration of connections, the total number of connections, or any combination thereof.

In another aspect, a method ensures that a user performs an educational task on a wireless device. The method comprises executing one or more application programs on the wireless device, wherein each application has a corresponding numerical priority, suspending each of the one or more application programs based on the corresponding one or more numerical priorities when a suspension criterion is met, and resuming the one or more application programs when the educational task is performed on the wireless device.

In another aspect, a method configures a mobile device. The method comprises loading onto a memory of the mobile device one or more application programs and loading onto the memory separately from the one or more application programs a testing application configured to suspend the one or more application programs when one or more suspension criteria are met and to resume the one or more application programs when a resumption criterion is met.

BRIEF DESCRIPTION OF THE DRAWINGS

FIG. 7 illustrates a record in a Question and Answer database according to one embodiment.

FIG. 9 shows a table associating priorities with application programs for determining which of the application programs are to be suspended according to one embodiment.

FIGS. 11A-E show a mobile phone presenting a user with an educational task according to one embodiment.

FIG. 15 shows a log of emergency calls placed and received on a mobile phone in accordance with one embodiment.

DETAILED DESCRIPTION OF THE INVENTION

Figure 1:
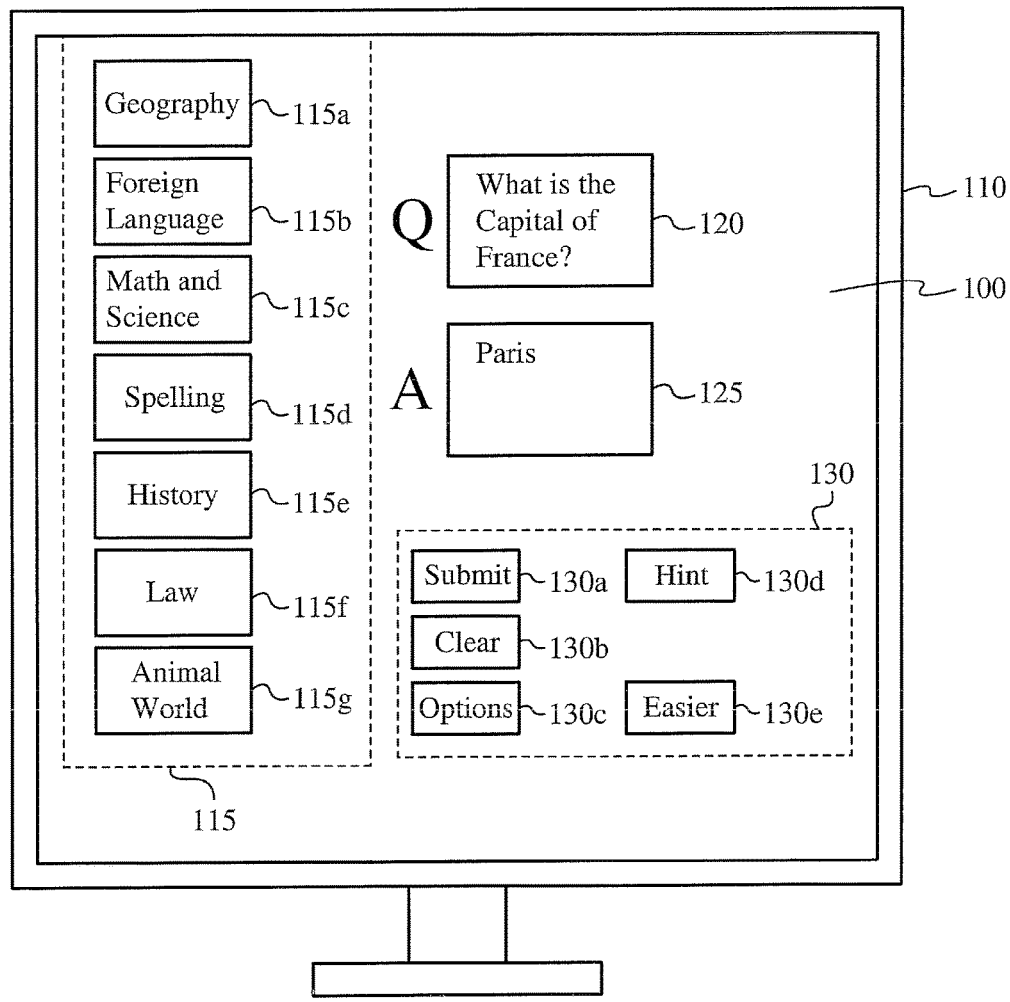
FIG. 1 illustrates a computer terminal displaying a graphical user interface to a testing system according to one embodiment.

Embodiments of the present invention are directed to a method and a system that suspend a user application on host systems and require a user, generally a student, to perform educational tasks before the user application program is resumed. The student can be a school-age child, an adult preparing for a certification exam, or anyone wishing to learn materials, such as a foreign language. The educational tasks require the student to perform tasks that help him memorize and learn materials. These tasks can include requiring a student to answer questions on a variety of topics, or to perform timed readings, analytical computations, and other tasks that help him memorize and learn materials.

The host system can be almost any kind of electronic equipment, including a personal computer; a video game player; a television set that may or may not be connected to a set-top box; a video cassette recorder (VCR); a CD player; a DVD player; or any other system upon which a user can be required to perform educational tasks.

In operation, the student may be enjoying an user application on the host system. The user application may, for example, be a computer application such as a computer chess game, an Internet chat session, a music or video application, a video game played on a game player, or a television program viewed on a television set or on a computer configured to receive television programs. When a suspension criterion is met, the user application is suspended or paused (e.g., auto-paused) and the student is required to perform an educational task before the user application is resumed. In this way, the student is forced to perform an educational task before he is allowed to again enjoy the user application. As used herein, the term "suspend" means to suspend, pause, auto-pause, delay, place in the background, or manipulate an application in any way so that it is interrupted and can be resumed at a later time. The term "suspend" is not limited to any specific command, sequence of commands, system calls, or any other methods for interrupting a unit of execution on a particular operating system or in a particular environment. As used herein, the term "suspend" is used to describe suspending, pausing, auto-pausing, delaying, placing in the background, or manipulating an application running on a processor executing on any operating system or other environment.

Educational Tasks

The educational task may be, for example, that the user answer a question correctly; meet a minimum performance criteria, such as correctly answering a specified number of questions based on a prior reading (i.e., a reading comprehension test); correctly pronouncing words or phrases in a foreign language, where the user's response is considered correct if it approximates the correct word or phrase; reading at least a pre-determined number of words within a pre-determined time; or completing at least a minimum number of educational tasks from a selected number of educational tasks.

The user application is suspended according to a suspension criterion. For example, the suspension criterion may be the elapse of a pre-determined amount of time since the last educational task, such as one hour, so that the student is required to perform an educational task once every hour. Alternatively, the suspension criterion may be the elapse of a random time period, or, if the host system is a television set, the suspension criterion may be the detection of the start of a television commercial. Alternatively, the suspension criterion can be the occurrence of a particular date and time. The frequency of the educational tasks can be wholly or partly dependent on a student's performance on past education tasks. As described in more detail below, the suspension criterion can be the occurrence of other events, which may vary over time.

In one embodiment, a testing system includes a testing application (executable code) and data used by the testing application, such as a database and one or more configuration files. When the testing application is run, the user is presented with a Testing graphical user interface (Testing GUI, FIG. 1), which in turn can be used to present a Configuration graphical user interface (Configuration GUI, FIG. 7). The testing application can also be used to access a Testing database (FIG. 5), which stores information presented though the Testing GUI.

The Testing Interface

The phrase "Testing GUI" as used herein is not intended to limit the types of tasks presented to a user. The Testing GUI can present tests that require the user to answer a question presented; it can present drills that require the user, for example, to read presented text within a given time limit and possibly answer questions related to the text; it can present foreign words and phrases, which the user must enunciate correctly within tolerable limits; or it can present other tests, drills, or tasks that help a user learn material.

The Testing GUI presents the student with the educational tasks, receives the student's responses, and informs the student whether he has submitted a correct or an incorrect answer. The Configuration GUI lets a parent, guardian, or teacher (a testing administrator) set parameters stored in configuration files used to configure the testing system. These configuration files may set the time intervals during which the student is presented with an educational task, or it may set the types of educational tasks that the student is presented with, including the topics and difficulty level of the educational tasks. In this way, a testing administrator can devise a lesson plan that the student must follow. This is helpful, for example, when the testing administrator determines that the student should concentrate on specific subjects having a specific difficulty level. It will be appreciated that the testing administrator may be the student when, for example, an adult or other responsible person wishes to test himself, as when an adult wishes to prepare himself for a certification exam or merely to learn a foreign language. Educational tasks and lesson plans can be based upon lesson plans previously presented to a student. Moreover, lesson plans can be devised so that educational tasks are apportioned among multiple subjects.

The Testing database stores the educational tasks that the student is presented. The Testing database may hold sets of questions and corresponding correct answers (question and answer pairs) on a variety of topics; it may contain text used in timed readings; and it may contain other information used to test a student's knowledge. The Testing database can be edited by the testing administrator to add, delete, or modify question and answer pairs or other information used for educational tasks.

In one embodiment of the present invention, when the user application is suspended, the testing application is moved to the foreground and run, thus presenting the student with the Testing GUI. Using the Testing GUI, the student can now access the testing system and select a topic that he would like to be tested on. The list of topics presented to the student may be stored in a configuration file. A testing administrator may determine, for example, that a student must focus on math and law, so the Testing GUI might only present the topics MATH and LAW, as described more fully below. The student can then select an educational task from the topics MATH and LAW.

When the student selects a topic that he is to be taught (such as, for example, by any combination of tests, drills, lessons, and the like), parameters in the configuration file determine the difficulty of the questions presented to him. The testing application then preferably selects a question from the Testing database having the selected topic with the appropriate difficulty level and presents it to the student through the Testing GUI. The student can now submit an answer to the question, request a hint, or request an easier question. If the student submits an answer through the Testing GUI, his answer is compared to an answer retrieved from the Testing database for the question presented (the answer in a question and answer pair, i.e., the "correct answer"). If the student's answer matches the correct answer, "CORRECT" is displayed on the Testing GUI and the user application is returned to the foreground and resumed. The educational task is now completed, and the student may resume the Internet session, video game, television program, or other user application that was suspended by the testing system. Preferably, the Internet session, video game, television program, or other user application is resumed at the point it was suspended or paused.

If the student's response does not match the correct answer, "INCORRECT" is displayed on the Testing GUI and the student is given another opportunity to submit an answer. The educational task will not be completed; the user application will not resume until the student has submitted a correct answer.

If the student asks for a hint, a hint to the question will be displayed on the Testing GUI. The student must now answer the question presented, or he may ask for an easier question. If the student asks for an easier question, the testing application will retrieve a question and answer from the Testing database having a difficulty level lower than that of the previously presented question or will retrieve a question and answer from the Testing database that the student has already answered correctly, thus reinforcing the student's knowledge of an answer. Again, the student may submit an answer to the question, request a hint, or request an easier question. The educational task will not be completed until the student submits a correct answer to the question presented.

Other embodiments of the present invention may present the student with other educational tasks. For example, a section of text may be presented to the student in the Testing GUI. The student may be required to read the text within a time limit, which might also be determined by a parameter in a configuration file. After the time limit has expired, the text will preferably be removed and replaced by one or more questions or drills related to the text and which the user must answer or perform. The question or drill can be a single question that the user must answer; a question and a set of multiple choice answers from which the user must select a correct answer; a comprehension drill, which requires that the user perform some task, such as correctly enunciating an English or foreign phrase found in the text; or any other number of questions, drills, or other educational tasks.

Alternatively, a section of text may be presented to the student in the Testing GUI. The student may be required to edit the text by deleting, adding, or rearranging words in the text so that the text is more concise or conforms to the rules of English grammar.

The testing system can also provide information about a student's performance. For example, it can provide a test score giving the percentage of educational tasks that the student performed correctly. A testing administrator can use these test scores and other information to gauge how well a student is learning educational materials.

Security

In one embodiment, the testing application ensures that it cannot be deactivated or removed, except by the testing administrator. This protection may be accomplished in many ways. For example, the testing application may be "owned" by a user having higher privileges than those of the student. Thus, for example, a testing administrator may "own" the testing application and thus only users with privileges equal to or greater than his may disable the testing system. By ensuring that a student has lower privileges than a testing administrator, it can be assured that students cannot disable the testing system and therefore must solve educational tasks (i.e., satisfy a resumption criterion) before the user application is resumed.

The testing administrator has other privileges not granted to a student. For example, the testing administrator may use a passcode to bypass the testing system so that the host system is returned to the user application even if an educational task is not performed. This privilege is denied to the student, who must perform an educational task before being returned to the user application. In one embodiment, the student is denied access to any combination of the Task Manager, services (such as, for example, in a Windows™ Operating System environment), and operating system commands that would allow him to terminate the testing system and resume the user application, without performing an educational task. This may be accomplished, for example, by changing the access permissions of any combination of the Task Manager application, services, and operating system commands so that only the testing administrator can execute them.

Example of Suspending Operation of a General Computer Device

FIG. 1 illustrates a computer terminal 110 displaying a Testing GUI 100 in accordance with one embodiment of the present invention. The Testing GUI 100 comprises a topic area 115, a question box 120, an answer box 125, and a control area 130. The topic area 115 contains topic buttons 115a-g, each of which displays a topic that the student can be tested on. In FIG. 1, the topic buttons 115a-g display the topics "Geography" 115a, "Foreign Language" 115b, "Math and Science" 115c, "Spelling" 115d, "History" 115e, "Law" 115f, and "Animal World" 115g. It should be apparent to those skilled in the art that these topics are exemplary and any other appropriate topics can be included in the topic area 115. The control area 130 contains control boxes 130a-f, each of which controls the operation of the testing system. In FIG. 1, the control area 130 contains a Submit button 130a, a Clear button 130b, an Options button 130c, a Hint button 130d, and an Easier button 130e.

In operation, when a student is first presented with the Testing GUI 100, the student chooses a topic by selecting the corresponding topic button. For example, if the student wishes to be tested on geography, he will select the Geography button 115a. He may do this by navigating his mouse so that it is over the Geography button 115a, and clicking a mouse button. A geography question can be selected in other ways, such as vocally, when a student speaks the word "geography" into a microphone coupled to the computer so that the computer translates the acoustical signals into digital signals corresponding to the selection "Geography." It will be appreciated that there are other methods using other input devices by which a computer can determine a student selection. It will also be appreciated that topics other than geography can be selected.

After the student has selected a topic, a question related to that topic will appear in the Questions box 120. The Testing GUI 100 illustrated in FIG. 1 shows the exemplary question "What is the capital of France?" being presented in the Question box 120. It will be appreciated that the question could be presented on other presentation devices, using other methods. For example, the question may be presented by playing a voiced recording on a speaker coupled with the computer system. The question may also be presented in other ways recognizable by the student.

The student may next enter his response in the Answer box 125. The Testing GUI 100 illustrated in FIG. 1 shows that the answer "Paris" has been entered into the Answer box 125. Once the student has entered an answer, he may submit it to the testing system by pressing the Enter key on a computer keyboard or by selecting the "Submit" button 130a in the control area 130. The student may select the "Submit" button by positioning his mouse pointer over the Submit button 130a and clicking a mouse button.

Alternatively, after entering text into the Answer box 125, the student may select the Clear button 130b, clearing the Answer box 125 of text. The student may now enter another answer into the Answer box 125 and submit it by selecting the "Submit" button 130a.

Alternatively, as described in more detail below, the student may also request an easier question by selecting the "Easier" button 130e. Or, he may ask for a hint to the question by selecting the "Hint" button 130d.

As described in more detail below, the testing administrator can limit the number of tries a student has to correctly answer a question or perform some other task or drill. For example, the testing administrator can set a parameter in a configuration file that limits the student to three tries to correctly answer a question. After three unsuccessful attempts to answer the question, the student is given some other question to answer or some other drill or lesson to perform. This restriction would require a student to think through his answer or response, rather than take an unlimited number of guesses that would not help him learn educational materials.

It will be appreciated that educational tasks may be presented and a student's responses entered using various interfaces. For example, the educational tasks may be presented using a textual display or a graphical user interface. The educational task may be presented on a speaker, used, for example, for visually-impaired students. Alternatively, the educational task may be presented using other presentation devices or any combination of presentation devices.

Likewise, student responses can be generated using a keyboard when, for example, the student is using a textual interface. The student response may also be generated using a mouse, when the student is using a graphical user interface. When the student response is generated using a graphical user interface, the student may be presented with a list of possible responses from which he can select one. A student response may be generated using a microphone when, for example, the student is disabled and unable to use a keyboard or a mouse or does not have access to a keyboard or a mouse. The microphone can be coupled with the computer, such that an acoustical signal is translated into digital signals that the computer recognizes as words. Alternatively, the student response can be generated using other input devices or any combination of input devices.

After the student has submitted an answer, the testing application reads it. If the answer is a correct answer, the student is notified that his answer was correct. The testing application is removed from the foreground and the user application that the student was using is returned to the foreground, resuming from where it was interrupted. Preferably, the testing application is placed in the background. If placed in the background, it will be returned to the foreground and run when a suspension criterion is met. For example, the suspension criterion may be the elapse of a pre-determined time interval such that the Testing GUI is presented to the student at the pre-determined time interval.

Suspension criteria may be set, for example, in parameters saved in configuration files that the testing application reads, either when the testing application is first loaded into the host system, when the host system is first powered on, or when a testing application updates parameters in the configuration files. The testing administrator may update parameters in the configuration files by first selecting the "Options" button 130c in the control area 130 of the Testing GUI 100. The testing administrator may now be presented with a Configuration GUI (FIG. 7) which preferably challenges the testing administrator for a passcode. In this way, only the testing administrator may change the parameters used by the testing application.

Once the testing administrator has entered a correct passcode, he may now use the Configuration GUI to set parameters in one or more configuration files. These configuration files may store various parameters used by the testing system. For example, the configuration files may store parameters that determine (1) suspension criteria, such as the time intervals that must elapse before the testing system is placed in the foreground, requiring a student to perform an educational task; (2) the educational topics that are presented to a student, thus outlining a lesson plan; (3) the difficulty level of the questions presented to a student; and (4) the titles of educational software packages from third-parties that are compatible with the present invention and that include educational tasks and other materials that can be presented to a student. Each of these parameters is discussed in more detail below. It will be appreciated that many other parameters can be included in a configuration file, which determine, among other things, the educational tasks, the suspension criteria, etc., of the present invention.

Suspension Algorithms

Figure 2:
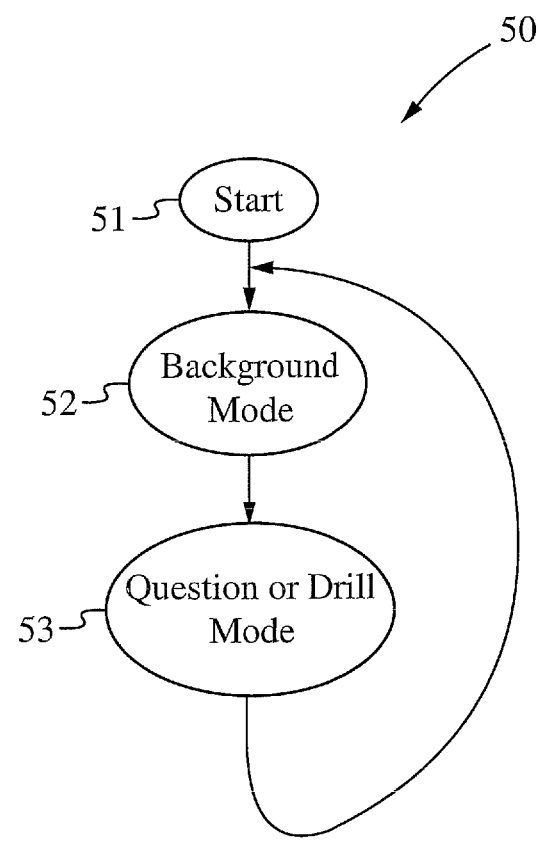
FIG. 2 is a state diagram of the testing system according to one embodiment.

FIG. 2 is a state diagram illustrating the states of the testing application in accordance with one embodiment of the present invention. In a start state 51, the testing application executes on the host system, initializing data by, for example, reading configuration files that it needs to operate. The start state 51 may be entered when a host system is first powered on or when the testing application is first loaded onto the host system. For example, the testing system may read configuration data that determines when it is placed in the foreground, suspending other applications that may be running. The other applications are suspended by placing them in the background, pausing their execution, or interrupting or modifying their execution as described above. Also, in the start state, the testing system can mask interrupt signals so that it cannot be interrupted and thus bypassed. In addition, the testing system can be given a high priority so that it cannot be preempted by applications with lower priorities, such as primary (user and non-educational) applications that a student may run.

Next, the testing system goes into a background mode 52. Alternatively, as for example in the UNIX™ operating system environment, the testing system may use the SLEEP command to put itself to sleep for a given time, placing itself into the background. The time that it sleeps may be determined by a suspension criterion. The suspension criterion may determine that the testing system sleeps for a pre-determined time interval or for a random time interval computed by, for example, a function that computes a random number within an acceptable range. If the host system is configured to receive television signals, the suspension criteria may be that the host system detects the start of a television commercial. Alternatively, the testing system can be configured so that when the host system is first powered on, the testing system skips the background mode and enters the question mode (described below) so that the Testing GUI is automatically presented to the student. This corresponds to a sleep time of 0 seconds.

While the testing system is in the background mode, a user application can execute on the host system. If the host system is a television set or a set-top box, the user application can be a television program, a DVD movie, a cable program, or any other program viewable on a television monitor. If the host system is a video game player, the user application can be a video game. If the host system is a personal or laptop computer, the user application can be a computer game, Internet session, computer application, or any other application that can be presented on a computer.

Once the sleep time has elapsed, the testing application enters a question or drill mode 53. In the question or drill mode 53, the testing application executes, suspending the user application that was running in the foreground, and presenting the Testing GUI to the student, which displays an educational task. Preferably, the testing system does this by running in the foreground. Alternatively, the testing system may do this, for example, by sending a SUSPEND signal to all of the user applications running on the host system and having a priority less than its priority. The testing system can be configured to have a priority higher than all of the user applications running on the host system. If the testing system has a priority higher than all other user applications the student can be prevented from running other user applications while the testing application is running. While the testing application is running, the student is also prevented from opening or interacting with programs accessible from other windows. The student can resume the user application when a resumption criterion is met.

Resumption Algorithms

The resumption criterion may be that the student completes an educational task, which may be the supplying of the correct answer to one or more questions or the performance of a drill. Alternatively, the resumption criteria may be that a testing administrator (such as a parent or teacher) enters a passcode to the testing system. The resumption criterion may be that a pre-determined time interval has elapsed. For example, if the testing system has been placed in the foreground but the host system has been idle for several days (or some other long period), the testing system may place itself in the background mode so that user applications may be enjoyed on the host system. Once the resumption criterion is met, the testing system returns to the background mode 52 by, for example, being placed in the background. Alternatively, the testing system can accomplish this by, for example, first sending a RESUME signal to all of the suspended processes, which resume executing from the point at which they received the SUSPEND signal. The testing system can then return to the background mode 52, by, for example, executing a SLEEP system call. The suspension criterion, invoking the testing application, will be met periodically so that a student is periodically presented with educational tasks. It will be appreciated that the testing system and any other application can be placed in the foreground or the background using many different commands, system calls, or other methods based on the environment that the testing system is run on.

In some embodiments, the suspension criterion can be altered when a student elects a question, drill, or other task more difficult than the one presented to him, and then successfully answers the question or performs the drill or task. For example, a suspension criterion may be that a user application is to be interrupted once every hour. When the student elects a question more difficult than the one presented to him and then correctly answers the question, the suspension criterion can be updated so that the user application is interrupted once every two hours. Thus, a student can be rewarded for attempting and successfully performing more challenging tasks.

In still other embodiments, the suspension criterion can vary over time. For example, a testing administrator may decide that a student should be tested more frequently, on more difficult questions or drills, or both as a target date (such as a final examination) approaches. For example, two weeks before a final examination the suspension criterion can determine that the user application is interrupted once every four hours so that the student is presented with a question or drill related to the final examination once every four hours. One week before the final examination, the suspension criterion can determine that the user application is interrupted once every hour. In addition, the questions presented or drills required may be more difficult than those presented two weeks before the final examination. One day before the final examination, the suspension criterion can determine that the user application is interrupted once every 30 minutes. In addition, the questions presented or drills required may be more difficult than those presented one week before the final examination. Thus, the student is prepared more and more thoroughly as the target date nears.

In still another embodiment, the testing administrator may allow a suspension criterion to be overridden. The testing administrator can set a parameter in a configuration file that allows a user application to continue executing even though a suspension criterion has been met. For example, the student may be transferring an important file to the host system. If the suspension criterion will be met in 30 seconds, the testing system may print to the screen, "WARNING: INTERRUPTION IN 30 SECONDS." The student may now notify the testing system that an important user application is running and should not be suspended; the file transfer is thus allowed to complete, uninterrupted.

Here, the suspension criterion can be handled in several ways. For example, the suspension criterion can be delayed so that the user application trying to execute immediately after the file transfer has completed, is suspended. Alternatively, the suspension criterion can be ignored until after the file transfer has completed. That is, the next time the suspension criterion is met, the currently running user application (not the file transfer) will be suspended. It will be appreciated that the suspension criterion can be handled in any number of ways.

Background Mode

Figure 3:
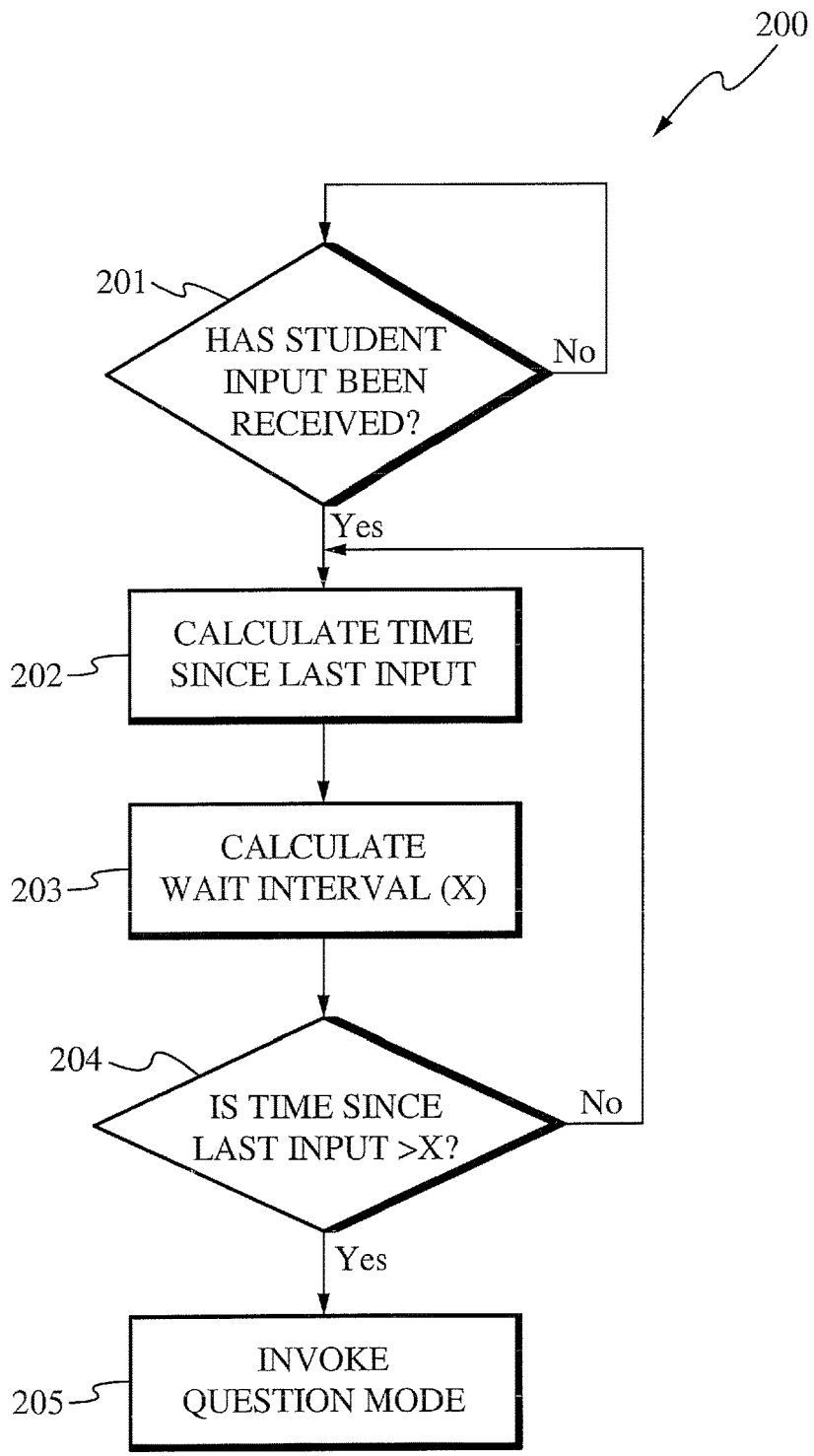
FIG. 3 illustrates a flow chart for determining when to display a testing interface according to one embodiment.

FIG. 3 illustrates a flow chart 200 for the background mode 52 when the suspension criterion is the elapse of a pre-determined time interval, X. In the embodiment illustrated in FIG. 3, the testing application is originally in the background mode 52. In the background mode, the host system may execute a user application. The testing application will only suspend the user application when X time units have elapsed since the student's last input. The student's last input corresponds to the student's completing an educational task. When X time units have elapsed, the testing application enters the question mode, described in more detail below. Thus, the testing application is invoked every X time units, suspending the user application. It will be appreciated that X can be a varying time unit when, for example, the suspension criterion is the elapse of a random time interval.

Referring to FIG. 3, in the step 201, the testing application checks whether a student has input a response to a question or drill. If the student has not input a response, the testing application loops back to the step 201, until the student does input a response. Once the student has input a response, the testing application then continues to the step 202. In the step 202 the testing application calculates the time since the last student input, corresponding, for example, to the student's submission of a correct response to an educational task. In the step 203 the testing application calculates the wait interval (X) and in the step 204 compares the time since the last student input with the wait interval. If the time since the last student input is less than the wait interval, the testing application returns to the step 202. Otherwise, if the time since the last student input is greater than the wait interval, the testing application goes to the step 205, in which it enters the question mode. As described above, in the question mode, the testing application preferably is placed in the foreground. As one example, the testing application can AWAKEN from a SLEEP call. The testing system will then present the student with the Testing GUI. It will be appreciated that the testing application can be placed in the foreground using many commands, system calls, or other methods based on the operating system or other environment that the testing system is being run on.

As described above, suspension criterion other than the elapse of a time interval can be used. For example, a suspension criterion can be the reception of a television or program commercial. This can be accomplished in many ways. For example, a host system can be configured to trigger an interrupt signal when it detects the start of a television commercial. The start of a television commercial may be identified, for example, by information that broadcast stations generally insert in television broadcasts to indicate where local stations can insert television commercials or other advertisements. When a host system identifies the start of a television commercial, it can generate an interrupt signal, which invokes an interrupt service routine. The interrupt service routine may then call the testing application as described above. Those skilled in the art will recognize many other ways to identify a television or other program commercial and then invoke the testing application.

Question Mode

Figure 4:
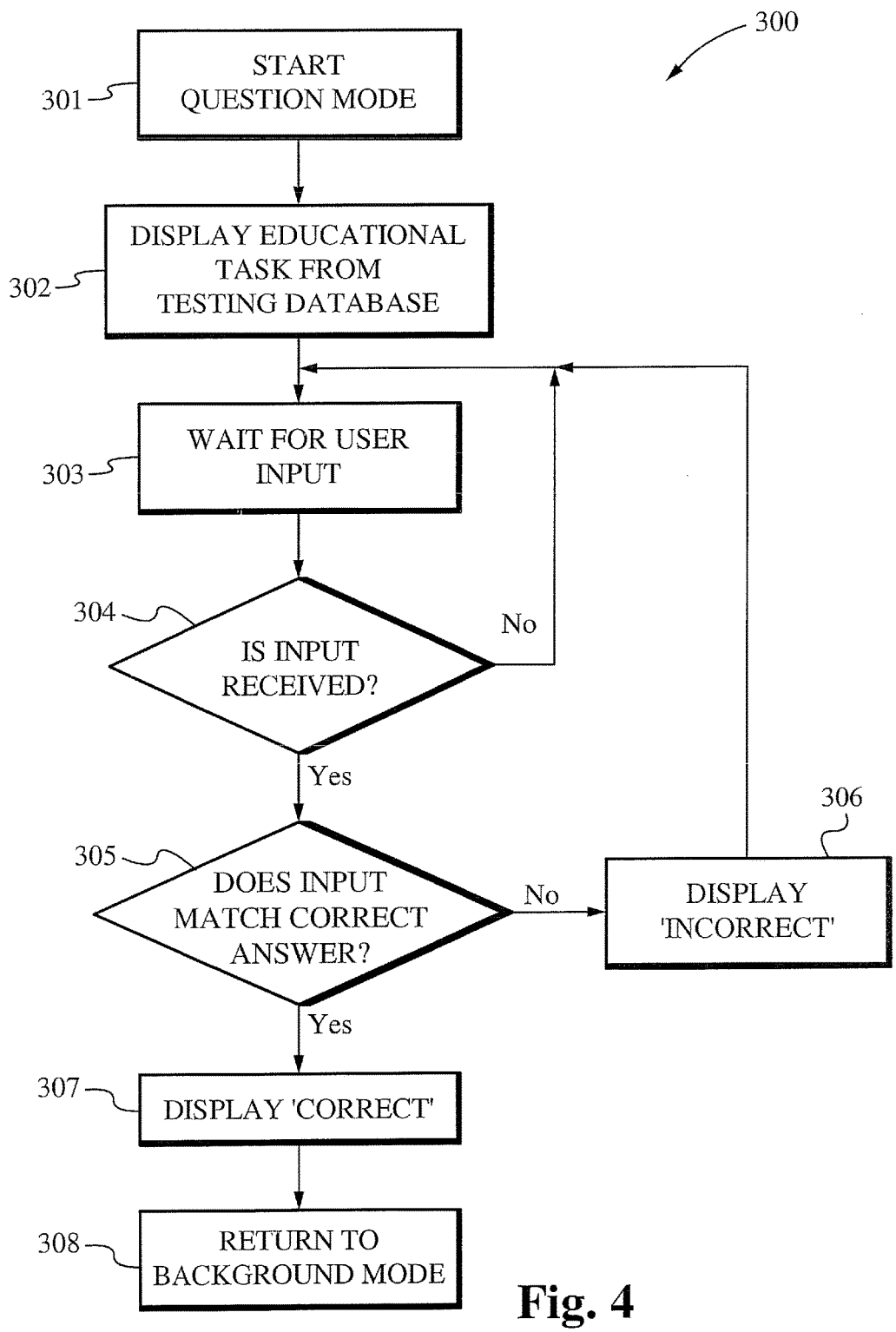
FIG. 4 illustrates a flow chart for reading in a user response and determining whether the response is correct.

FIG. 4 illustrates a flow chart 300 for the question mode 54 described in FIG. 2. In the step 301, the testing application starts the question mode. In the step 302, the testing system displays an educational task. At this point, the testing system may retrieve a question and answer pair from the Testing database. The educational task (e.g., the question in a question and answer pair) will be displayed in the Testing GUI 100, illustrated in FIG. 1. In the step 303, the testing application waits for student input, and in the step 304, checks whether it has received student input. If the testing application has not received student input, it returns to the step 303. If the testing application has received student input, it then proceeds to the step 305, where it compares the student input to a correct answer (e.g., the answer from a question and answer pair) from the Testing database. If the testing application receives (e.g., a student has submitted) a correct answer, it proceeds to the step 307 where it displays the word "CORRECT" on the Testing GUI and then, in the step 308, returns to the background mode. The user application will then be unsuspended and thus returned to the foreground. If, in the step 305, the testing application does not receive a correct answer, it proceeds to the step 306, where it displays the word "INCORRECT" on the Testing GUI and then proceeds to the step 303.

The testing system will now be described in more detail in relation to the question mode. Referring again to FIG. 4, in the question mode a student is prompted with a question, as illustrated in the step 302. For example, the question "Who was the first president of the United States?" may be presented in the Question box 120 on the Testing GUI 100 of FIG. 1. The testing application will next wait for student input in the step 303 and check the input in the step 304. From the Testing GUI, the student may, for example, enter the name "Thomas Jefferson" in the Answer box 125 and submit the name by clicking on the "Submit" button, as shown in FIG. 1. In the step 305, the testing application compares the submitted answer "Thomas Jefferson" with the correct name "George Washington" (the answer in the question and answer pair) retrieved from the Question and Answer database illustrated in FIG. 4. Because the submitted answer does not match the correct answer, the testing application proceeds to the step 306 so that the word "INCORRECT" is displayed in the Answer box 125. The testing application now returns to the step 303.

At the step 303, the testing application again waits for a student input, and at the step 304 again checks that the student input has been received. If the student now enters the correct name "George Washington" and submits it by clicking on the "Submit" button as shown in FIG. 1, the testing application proceeds to the step 305. In the step 305 the testing application compares the submitted answer "George Washington" with the correct answer "George Washington," which is stored, for example, in the Default Question and Answer module 401 in the Question and Answer database 400 illustrated in FIG. 4. Because the submitted answer matches the correct answer, the testing application proceeds to the step 307, in which the word "CORRECT" is displayed in the Answer box 125. The testing application proceeds to the step 308, in which it is returned to the background mode. The user application, which the user had been using, is now resumed.

As described above, it will be appreciated that the testing system may receive input from one of many input devices, including, but not limited to, a keyboard, a mouse, and a microphone. Similarly, the testing system may display messages such as those displayed in the steps 302, 306, and 307, on a multitude of presentation devices such as computer display monitors, game monitors, and speakers. In addition, the testing system may receive data on a plurality of input devices, such as a keyboard, a mouse, and a microphone.

Those skilled in the art will recognize other ways for periodically invoking a testing application. For example, a testing system may use a cron file, used on many UNIX™ compatible systems, and containing a list of files to be executed and the time of day they are to be executed. Thus, a testing administrator may include a cron file in a host system, specifying the time of day that the testing application is to be invoked. Of course, the testing application may also be invoked by other independent programs running on the host system. It will be appreciated that there are other ways of periodically executing a testing application.

Testing Database

Figure 5:
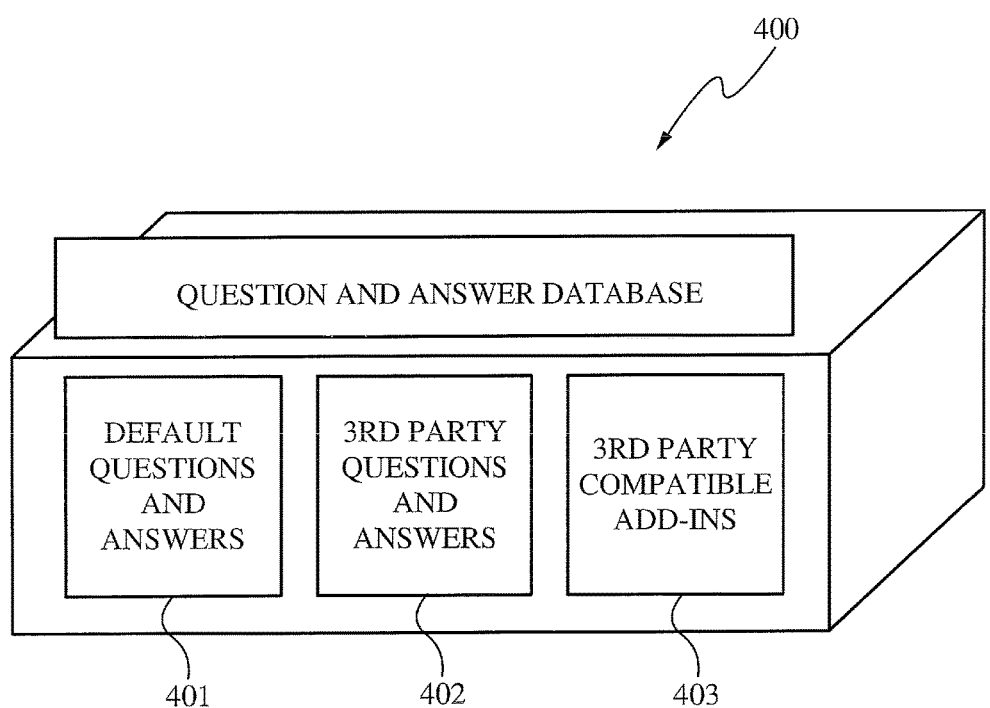
FIG. 5 illustrates a high-level overview of a database containing question and answer pairs and third-party components according to one embodiment.

FIG. 5 depicts a Testing database illustrated as Question and Answer database 400, in which is stored the questions presented to a student in the step 302 of FIG. 4 and the corresponding correct answers (question and answer pairs) matched against the student input in the step 305. The Question and Answer database 400 may take one of may forms. For example, the Question and Answer database 400 can be a flat-file database, in which questions and answer pairs, and other data are separated by delimiters. Alternatively, the Question and Answer database 400 can be a relational database, composed of multiple, related tables. A relational database can be organized in many different ways. For example, a relational database can be organized so that each question and answer pair for each topic, regardless of difficulty level, are stored in one table. Alternatively, a relational database can be organized so that question and answer pairs for a given topic and having the same difficulty level are stored in one table. It will be appreciated that in accordance with the present invention, question and answer pairs can be stored in a relational database using many different organizational schemes.

FIG. 5 illustrates one embodiment of a high-level overview of a Question and Answer database 400, which comprises a Default Questions and Answers module 401, a Third-Party Questions and Answers module 402, and a Third-Party Compatible Add-Ins module 403. The Default Questions and Answers module 401 is originally supplied with the Question and Answer database 400. As described below, a testing administrator can edit this file to alter, add, or delete question and answer pairs in the Question and Answer database 400. The Third-Party Questions and Answers module 402 contains question and answer pairs not originally supplied with the Questions and Answer database 400. The testing administrator may, for example, find a third-party package that contains question and answer pairs that the testing administrator would like to include as part of the educational tasks presented to a student. In one embodiment, the Third-Party Questions and Answers module 402 remains as a module separate from the Default Questions and Answers module 401 so that it can easily be uninstalled. In another embodiment, the Third-Party Questions and Answers module 402 may be combined with the Default Questions and Answers module 401 to form a single table or collection of tables that form a relational database or a flat-file database.

Third-Party compatible Add-Ins are other files that the testing system can use to present educational materials to the student. These files may contain information other than question and answer pairs. These files may, for example, contain (1) a section of text that the student is required to read within a given time and (2) questions and answer pairs relating to the text. Of course, the Third-Party Compatible Add-Ins can contain other educational information that the testing system presents to the student to help him learn and memorize materials.

In sum, the testing system can make use of third-party data files, third-party applications, and other third-party files. The testing system can use these files to present a student with supplemental foreign language pronunciation drills, English reading comprehension drills, English reading drills, additional question and answer pairs, and the like. The testing system can thus seamlessly incorporate compatible tools to supplement the educational tasks available to a student.

Figure 6:
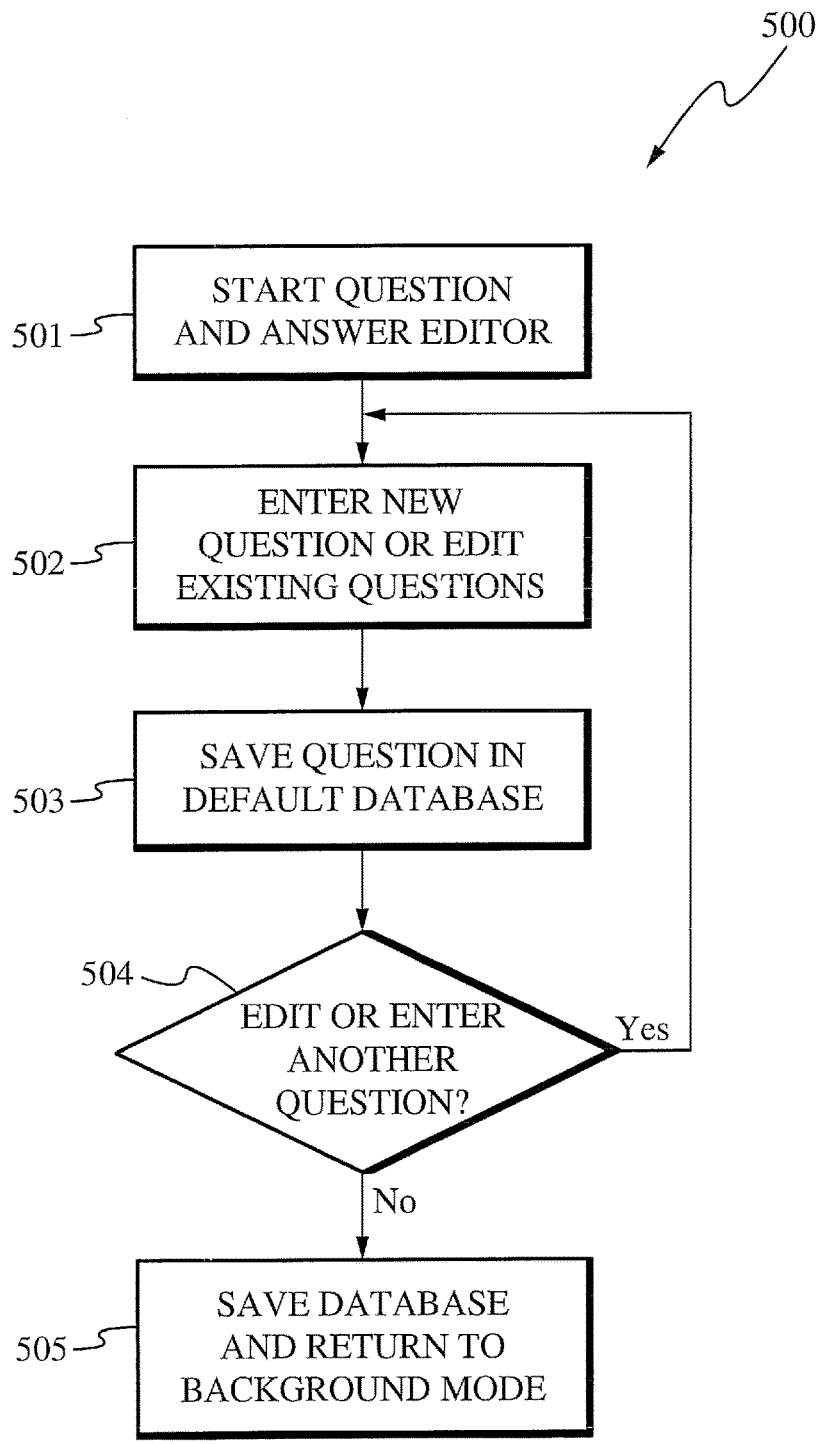
FIG. 6 illustrates a flowchart illustrating steps for updating a database of question and answer pairs according to one embodiment.

FIG. 6 illustrates a flow chart 500 for editing the Default Question and Answer module 401. In the step 501 the testing administrator starts the Question and Answer editor. Next, in the step 502, the testing administrator enters a new question and answer pair or edits an existing question and answer pair. For example, if the Question and Answer database 400 is a flat-file database, the Question and Answer Editor can be used to open the file, edit a line containing a question and answer pair, add a line containing a new question and answer pair, or delete a line containing a question and answer pair. Alternatively, if the Question and Answer database 400 is a relational database, the Question and Answer Editor can be used to update a record containing a question and answer pair, insert a record containing a new question and answer pair, or delete a record containing a question and answer pair. It will be appreciated that the Default Questions and Answers database may be other types of databases that can be updated using other commands and formats, or may be a database in other formats, such as an encrypted or compressed format.

Next, in the step 503, the question and answer pair are saved in the Default Question and Answer module 401. This may be accomplished in different ways, depending on the type of database. For example, if the Default Question and Answer module 401 is a flat-file database, the Question and Answer Editor may save the flat-file database using a simple save command found in most editors. Alternatively, if the Default Question and Answer module 401 is a relational database such as an Oracle™ relational database, the Question and Answer Editor may use a "COMMIT" command to store an updated record containing a question and answer pair to the Question and Answer database.

Next, in the step 504, the testing administrator can choose to edit another question and answer pair in the Default Question and Answer module 401. If the testing administrator decides to edit another question and answer pair in the Default Question and Answer module 401, the testing application returns to the step 502; otherwise, the Question and Answer editor proceeds to the step 505, in which the Testing database is saved and the testing application is returned to the background mode.

One embodiment for selecting and organizing question and answer pairs will now be described when the Testing database is a relational database. Tables in the database may, for example, have fields labeled TOPIC, QUESTION NO, QUESTION, ANSWER, DIFFICULTY, HINT, and ASKED. The field TOPIC will contain a string designating a topic, such as "GEOGRAPHY" or "MATH and SCIENCE". The QUESTION NO field may contain a number designating the number of the question for that topic and difficulty level, as described below. The QUESTION field may contain a string designating the question to be asked; this string may be displayed in the Question box 120, as described in the step 302 in FIG. 4.

The ANSWER field may contain a string designating the answer for the question in the QUESTION field (e.g., the answer in a question and answer pair). The DIFFICULTY field may contain an integer designating a difficulty level for the question in the QUESTION field. For example, larger integers may designate more difficult questions. Alternatively, the DIFFICULTY field may contain a string, with one part designating the grade-level of the question, and another part designating the difficulty-level for that grade. Thus, for example, the string "7-1" may designate a seventh-grade level question with a difficulty level of one (the lowest difficulty level for a seventh grader, corresponding to the easiest question). The HINT field may contain a hint to help the student answer the question.

Finally, the ASKED field may contain an integer or other identifier designating whether the question has been asked before. Originally, the ASKED field may contain the integer 0, indicating that the question has not yet been asked. Once the question has been asked, the ASKED field may be updated to contain the integer 1. The testing application may use this field to ensure that the same question is not asked repeatedly. After a given time limit, or after all of the questions in a given TOPIC and DIFFICULTY level have been asked, the testing application may reset the ASKED field for all the QUESTIONS with that topic and difficulty level to 0.

FIG. 7 illustrates one example of a record 700 in the Question and Answer database 400. The record 700 has a TOPIC field 710a containing the string "SCIENCE"; a QUESTION NO field 710b containing the integer 1; a QUESTION field 710c containing the string "Hydrogen and what other molecule combine to form water"; an ANSWER field 710d containing the string "Oxygen"; a DIFFICULTY field 710e containing the string "7-2", which corresponds to the second-easiest level of question for a seventh grader; a HINT field 710f containing the string "It starts with the letter 'O'"; and an ASKED field 710g containing the integer 1, indicating that the question has already been asked. It should be noted that the underlined items in FIG. 7—TOPIC, QUESTION NO, QUESTION, ANSWER, DIFFICULTY, HINT, and ASKED—are shown for ease of illustration and are not part of the record 700.

In operation, a student may select the TOPIC of SCIENCE and a DIFFICULTY level for the least advanced seventh grader ("7-1"). The student may select the topic from the topic area 115 of the Testing GUI 100, as illustrated in FIG. 1. The difficulty level may be set by the testing administrator using a Configuration GUI. The testing application may thus formulate a query to the Testing database (such as a relational database) to select all records for which the TOPIC field contains the string "SCIENCE", the DIFFICULTY field contains the string "7-1", and the ASKED field contains the integer 0 (e.g., the question has not been asked yet). The query may return a group of records, from which one will be chosen and whose string in its QUESTION field will be displayed in the Question box 120. If the student's response entered in the Answer box 125 matches the string contained in the ANSWER field of the selected record, the Testing GUI will display the string "CORRECT" in the Answer box 120; otherwise, the testing GUI will display the string "INCORRECT" in the Answer box 125. Once the question has been asked, the system will update the record so that the ASKED field contains the number 1, indicating that the question has been asked. If, for example, all of the questions for a given TOPIC and DIFFICULTY level have been asked (i.e., all of their ASKED fields contain the integer 1), then the testing application may update all of the records so that their ASKED fields all contain the integer 0. All of the questions in that topic with the given difficulty level may now be asked again.

In another embodiment, the educational task may consist of answering more than one question correctly. For example, the resumption criterion may be that the student answer two questions correctly. That is, the student may have to answer two questions correctly before the non-educational (primary) application is placed in the foreground and resumed. Alternatively, the resumption criterion may be that the student answer two question having designated topics and difficulty levels. For example, the testing administrator may determine that the student needs to concentrate on the topics "Math and Science" and "Law." Accordingly, the student may have to answer a pre-determined number of questions having a TOPIC field that contains the string "Math and Science" and a pre-determined number of questions having a TOPIC field that contains the string "Law" before the non-educational application is resumed. As described above, parameters in configuration files described above may, for example, set the difficulty level of the questions presented to the student; the topics presented to the student, which can determine a lesson plan; and the frequency with which questions are presented to the student.

Configuration GUI

Figure 8:
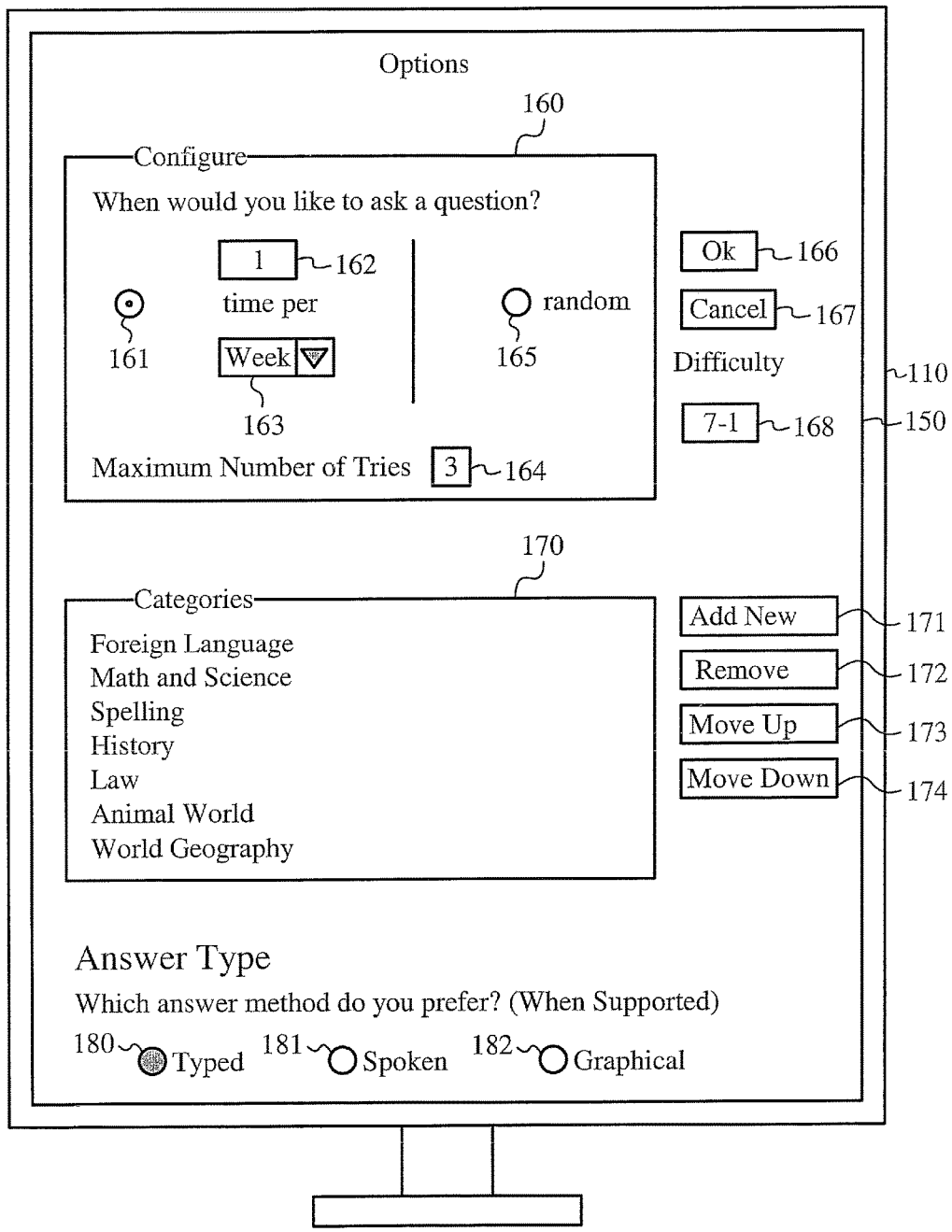
FIG. 8 illustrates a computer terminal displaying a graphical user interface used to configure a testing system according to one embodiment.

FIG. 8 illustrates a computer monitor 110 displaying one embodiment of a Configuration GUI 150 used to set parameters in a configuration file. The Configuration GUI 150 can be accessed by selecting the Options button 130c from the Testing GUI 100 illustrated in FIG. 1. The Configuration GUI 150 contains a configure area 160. The configure area 160 contains a constant interval selection area, preferably comprising a radio button 161, a frequency text area 162, and an interval pull-down menu 163. In operation, when a testing administrator selects the radio button 161, the testing application will be placed in the foreground a given number of times (determined by the number in the frequency text area 162) in each time interval (determined by the interval selected in the pull-down menu 163). The example shown in FIG. 8 illustrates that the testing application will be placed in the foreground once each week. It will be appreciated that other time intervals could be chosen. For example, when the number 7 is entered into the frequency text area 162, the testing application will be placed in the foreground at constant time intervals, seven times each week (e.g., once every 24 hours).

Alternatively, the pull-down menu 163 can be selected to choose a different time interval. For example, the pull-down menu 163 can be used to select a time interval of a second, a minute, an hour, a day, a week, a month, or any other time interval. Thus, for example, if the pull-down menu 163 is used to select a time interval of one hour and the frequency text area 162 contains the number 1, then the testing application will be placed in the foreground once every hour.

Alternatively, if the radio button 165 is selected, the testing application will be placed in the foreground at random time intervals.

Preferably, the configuration area 160 also contains the text "Maximum Number of Tries" and a corresponding Tries text area 164. The number entered into the Tries text area 164 determines the maximum number of consecutive incorrect answers a student can supply to one question before he is required to answer another question. As illustrated in FIG. 3, the number 3 is entered into the Tries text area 164. Accordingly, the student must answer a question with three or fewer attempts. If, after three attempts, the student has not successfully answered a question, he is given a different question to answer. At a later time, the student may again be presented with the question that he was unable to answer correctly. It will be appreciated that a number larger or smaller than three can be entered into the Tries text area 164. Entering the number 0 into the Tries text area 164 may, for example, indicate that the student has an unlimited number of attempts to correctly answer one question.

The Configuration GUI 150 also preferably contains a categories area 170, which contains the categories (topics) presented to the student in the topic area 115 of the Testing GUI 100. The testing administrator can add and remove categories presented to the student in the topic area 115. For example, through the Configuration GUI 150, the testing administrator can add a category presented to the student by positioning a mouse to highlight text indicating a category to be added, and then clicking the "Add new" button 171. Alternatively, the testing administrator can remove a category presented to the student in the topic area 115 by positioning a mouse to highlight text indicating a category to be removed, and then clicking the "Remove" button 172. The testing administrator can also click on the "Move up" button 173 to sequentially move up the list of topics in the categories section 170, highlighting each one in turn; or he can click on the "Move down" button 174 to sequentially move down the list of topics in the categories section 170, highlighting each one in turn. The testing administrator can then add or remove those topics that are highlighted.

The Configuration GUI 150 also allows the testing administrator to select the type of task interface that the student can use to receive and answer educational tasks presented on the Testing GUI 100. For example, when the "Typed" radio button 180 is selected, the Testing GUI can present and receive typed data (e.g., questions and answers) from, for example, a keyboard; when the "Spoken" radio button 181 is selected, the Testing GUI can present and receive spoken data from, for example, a microphone and speaker; and when the "Graphical" radio button 182 is selected, the Testing GUI can present and receive graphical data from, for example, a graphical user interface. It will be recognized that data can be presented to and received from the student using other interfaces.

The Configuration GUI also allows the testing administrator to set the difficulty level of the educational tasks presented to the student. The testing administrator can do this by entering a difficulty level in the Difficulty text area 168. FIG. 8 illustrates that the phrase "7-1" has been entered into the Difficulty text area 168, indicating that the educational tasks presented to the student will be at the seventh grade level, with the lowest difficulty level. It will be appreciated that other difficulty levels could be entered into the Difficulty text area 168.

When the testing administrator has entered the parameters that determine the type of educational tasks presented to the student, the frequency with which the educational tasks are presented, the difficulty level of the educational tasks, and the task interface (e.g., typed, spoken, or graphical), he may save the parameters by clicking on the "Ok" button 166, or he may cancel what he has entered so that he can insert different parameters by clicking on the "Cancel" button 167. By clicking on the "Ok" button 166, the parameters are saved in one or more configuration files used by the testing system. The window to the Configuration GUI is now closed and the testing application placed in the background mode. The testing application will now use the saved parameters in the configuration files to determine when the testing application is placed in the question mode (e.g., placed in the foreground), the topics presented to the student, the difficulty level of the educational tasks, and the task interface types (e.g., typed, spoken, or graphical).

Other embodiments of the Configuration GUI determine that the testing application will be executed when the host system receives a television commercial. It will be appreciated that the Configuration GUI can be used to set other suspension and resumption criteria.

Numerical Priorities

In one embodiment, each application program is assigned a numerical priority. For example, using an interface (not shown), a testing administrator assigns a numerical priority to the testing application and also to each of the applications loaded onto an electronic device for later execution. In this example, the smaller the value of the numerical priority, the larger the priority of the application. Thus, when a suspension criterion is met, an application is suspended if it has a priority with a numerical value larger than that of the testing application. Because the testing administrator can set the values of the numerical priorities, she can determine which applications are suspended when a suspension criterion is met; in some embodiments, the student cannot change these values and thus has no control over which application programs are suspended. In one embodiment, the numerical priority values are stored in a table that associates a numerical priority with each application.

FIG. 9 illustrates a table 800 listing applications, executing or not, on an electronic device and their associated numerical priorities. The table 800 contains rows 801-807 and columns 850 and 860. Each of the rows 801-807 contains an (application identifier, numerical priority) pair. For example, the row 801 contains an identifier for a telephone application (column 850) and a numerical priority (the value "10", column 860). In some embodiments, the identifiers in the column 850 are process identifiers assigned to the applications by an operating system executing on the electronic device. In one embodiment, the table 800 is a process table, which an operating system uses to execute a process, place it on a READY queue, place it on a WAIT queue, put it to SLEEP, or terminate it.

Referring to the table 800, if the testing application has been assigned a numerical priority with the value "12", when the suspension criterion is met, the applications in rows 802-807 are suspended because each has a numerical priority with a value larger than 12. The telephone application (row 801) is not suspended because it has a numerical priority value ("10") smaller than "12." In this way, even when a suspension criterion is met, the telephone application is not suspended. The user is still able to make a phone call, such as one to ask a parent to pick her up from school.

While FIG. 9 illustrates associating higher priorities with smaller numerical priority values, other embodiments associate higher priorities with larger numerical priority values.

In operation, when the telephone application (row 801) is loaded into a memory of an electronic device for execution, its identifier (column 850) and priority ("10", column 860) are loaded into the table 800. Similar information is stored for a Web browser application (row 802), a text messenger application (row 803), an Internet facsimile application (row 804), an electronic mail application (row 805), a contact/address book application (row 806), and a game application (row 807). When a suspension criterion is met, the testing application traverses the table 800, locating each application (row) with a numerical priority having a value larger than that of the testing application, and suspending the corresponding process (application) using its process identifier. In one embodiment, this is performed by executing a SUSPEND(process ID) system call. When a resumption criterion is met, the testing application again traverses the table 800 and awakens each suspended process.

It will be appreciated that the applications listed in the table 800 are merely exemplary. In some systems, such as a dedicated gaming system, the telephone application (row 801) is not included in the table 800. Indeed, depending on the electronic device and its associated functions, the table 800 is able to include any subset of the applications shown in FIG. 9 or any other combination of applications.

Abraham Silberschatz, Peter Baer Galvin, and Greg Gagne, Operating System Concepts 202-204 (6th ed., John Wiley and Sons, Inc. 2002), which is incorporated by reference, describes a "C" data structure, a semaphore, and functions that are able to be used in accordance with embodiments to identify, suspend, and resume user applications:

typedef struct {
int value;
struct process *L;
} semapahore;
void wait (semaphore S) {
S.value--;
if (S.value <0) {
  add this process to S.L;
  block( );
}
} void signal (semaphore S) {
S.value++;
if (S.value <=0) {
  remove a process P from S.L;
  wakeup(P);
}
}

Thus, in accordance with the embodiments, a process ID is able to be associated with a semaphore. After the process ID is stored in a table (e.g., table 800), the process is able to be blocked (suspended) using the wait function when a suspension criterion is met and resumed using the signal function when a resumption criterion is met.

It will also be appreciated that while the UNIX operating system is discussed in many examples, embodiments are able to be used with any operating system including those tailored for mobile devices such as cell phones. Operating systems in accordance with the present invention include, but are not limited to, Binary Runtime Environment for Wireless ("BREW"), Symbian OS™, Java™, Windows™ Mobile, embedded Linux, Palm™, and ITRON (Industrial version of The Real-time Operating system Nucleus ("TRON")), to name only a few operating systems.

Other Ways of Suspending Applications

In other embodiments, the testing system "broadcasts" a SUSPEND signal to one or more applications executing on the host system. As used herein, "broadcasting" means transmitting a SUSPEND signal to all or a selected subset of applications that are not directly linked to or embedded with the testing application. Generally, a broadcasting program does not know the name, process ID, or other identifier of programs to be suspended. Thus, applications known to the testing system "anonymously" through the operating system or an abstract layer are able to receive and be suspended by the broadcast SUSPEND signal.

Those skilled in the art will recognize other ways to suspend and resume applications in accordance with the embodiments, such as those based on EVENT signals and other synchronization means.

Mobile Phone Examples

It will be appreciated that all of the features discussed above are able to be implemented on mobile phones and other mobile devices. In accordance with embodiments, applications executing on mobile phones, including the mobile phone application itself (e.g., sending and receiving calls, emails, text messages, Web pages, and any combination of these), are able to be suspended when a suspension criterion is met. As some examples, the mobile phone application (referred to, simply, as the cell phone) is suspended if, during a single "allotment" period on the phone, (1) the costs accumulated to use the cell phone (including incoming and outgoing calls) exceeds a predetermined threshold, (2) a predetermined number of calls (combining incoming and outgoing) have been made, (3) a predetermined number of calls (combining incoming and outgoing) to a predetermined telephone number (e.g., of a boyfriend or girlfriend) have been made, (4) a duration of the total calls on the phone exceed a predetermined threshold, or (5) any combination of these. Alternatively, or additionally, the phone is suspended at predetermined time intervals, random time intervals, or any other time intervals discussed in other embodiments, such as the embodiment illustrated in FIG. 3.

Examples of an allotment period include a day, a week, a month, a year, or any other predetermined time period.

Hardware

Figure 10:
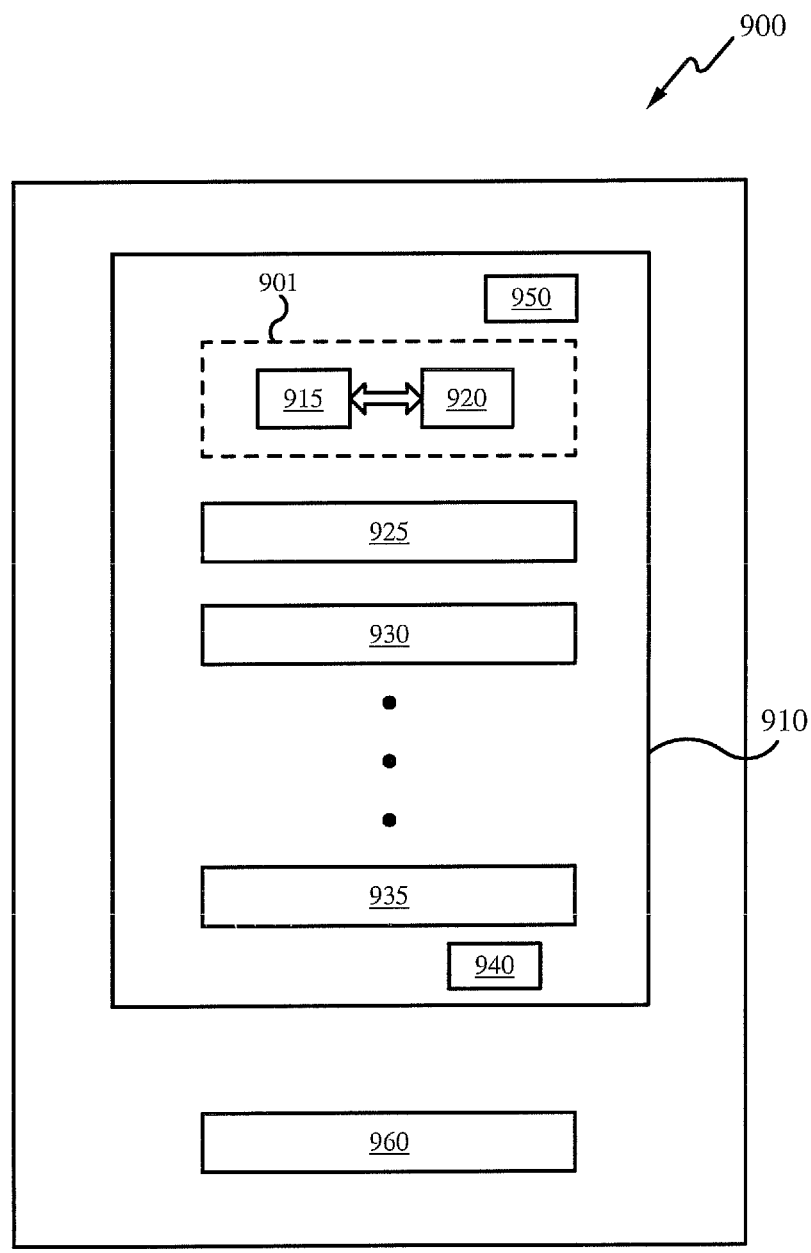
FIG. 10 is a block diagram of components of an electronic device configured to suspend application programs according to one embodiment.

FIG. 10 shows hardware components of an electronic device 900, such as a mobile phone, in accordance with some embodiments. The device 900 includes a memory 910 that stores a testing application 901, a loader 950, a table 940, a processor 960, and applications 925, 930, and 935. The testing application 901 includes a suspension-resumption module 915, for suspending and resuming user applications, in communication with a database 920, similar to the database 400 of FIG. 5. The applications 925, 930, and 935 are, respectively, a mobile phone application, an electronic mail application, and a Web browser application. The table 940, like the table 800 of FIG. 9, stores process identifiers and corresponding numerical priority values for the applications 925, 930, and 935.

In embodiments, the algorithms described in this application (e.g., FIGS. 2, 3, 4, and 12-14) are all implemented in computer-executable instructions stored on computer-readable media. Electronic devices in accordance with embodiments comprise the computer-readable media and processors configured to perform the instructions to thereby perform the algorithms.

Operation

In operation, the device 900 is configured using a Configuration GUI (not shown). The GUI allows a user to invoke the loader 950 to load the user applications 925, 930, and 935 into the memory 910 for later execution and thereby populate the table 940 with process identifiers for the applications 925, 930, and 935. Numerical priority values are then associated with each of the applications 925, 930, and 935. In some embodiments, a testing administrator uses the GUI to change the values of some or all of the numerical priorities. In this way, the administrator determines which, if any, of the applications 925, 930, and 935 are suspended when a suspension criterion is met. Finally, the suspension module 915 is then executed. The device is now used normally, such as to place and receive phone calls, to play computer games, to send text messages, etc.

Later, when a suspension criterion is met, those applications stored in the table 940 with numerical priorities having values larger than that of the testing application are all suspended, and a question is presented to a user on the device 900. When a resumption criterion is met (e.g., the user answers the question correctly on the device), the suspended applications are all resumed. The process of suspending and resuming applications is repeated each time a suspension criterion is met.

It will be appreciated that a user application is able to be loaded onto the device 900 and its identifier added to the table 940 independently of the testing application 901. For example, an application is able to be loaded at any time before or after the testing application 901 is loaded. Accordingly, the user applications are stored in the memory 910 separately from the testing application 901. Similarly, user applications are able to be unloaded from the memory 910, and even removed entirely from the device 900, independently of the testing application 901.

Suspending Applications on a Mobile Phone

FIGS. 11A-E show a mobile phone 1000 in accordance with one embodiment during a sequence in time. In addition to a mobile phone application program, the mobile phone 1000 executes a game program, a text messenger, a Web browser application, and an application that displays stored digital images. The mobile phone 1000 has a keypad 1020 and a display screen 1015. FIG. 11A shows the mobile phone 1000 when a user activates it to play a game, make a call, or invoke any other application. When a suspension criterion has been met, she is presented with the screen 1015 in FIG. 11A, explaining that she has exceeded her allotment of telephone calls for the month. Predetermined ones of the applications executing on the mobile phone 1000 (e.g., those with a numerical priority having a value larger than a predetermined value), all except the phone application itself, are suspended. In this way, the user is able to make a call on the mobile phone 1000, but is not able to execute any of the suspended applications.

Next, the display 1015 shown in FIG. 11B is automatically shown to the user, explaining that she must answer a question before she is allowed to execute any of the suspended applications. Next, as shown in FIG. 11C, a question is presented to the user on the screen 1015. If, as shown in FIG. 11D, the user enters the correct response, the suspended applications are resumed, as shown in FIG. 11E.

While FIGS. 11A-E show that the mobile phone application is not suspended, allowing a user to make an emergency or other call, in other embodiments, the mobile phone application is suspended or allows the user to make calls to only specified numbers.

High-Level Flow Chart

Figure 12:
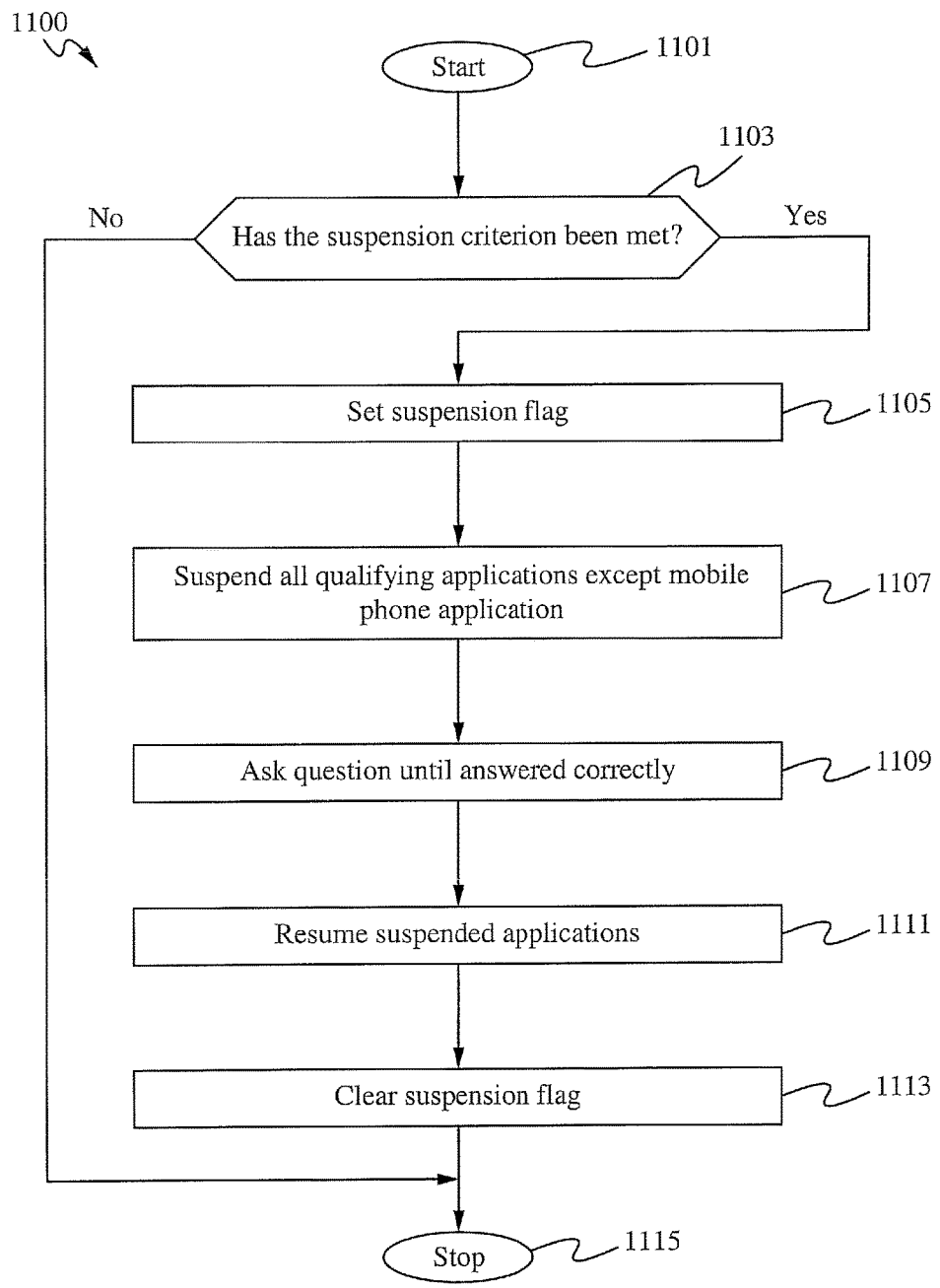
FIG. 12 shows the steps of a process for suspending application programs on a mobile device when a suspension criterion is met in accordance with one embodiment.

FIG. 12 is a flow chart showing the steps of a process 1100 performed by a testing system in accordance with one embodiment. Preferably, the process 1100 is invoked periodically, such as once a minute, once a day, or once any other predetermined period of time. In the start step 1101, the process initializes any parameters. Next, in the step 1103, the process determines whether the suspension criterion has been met. The suspension criterion is determined from suspension parameters (e.g., costs incurred on the mobile phone for the month, duration of all calls on the mobile phone for the month, or a weighted combination of both) which are either stored on the mobile device or retrieved from a remote host, such as described below. If the suspension criterion has been met, the process proceeds to the step 1105, in which a suspension flag is set; otherwise, the process proceeds to the step 1115, where it stops, to be invoked later.

From the step 1105, the process proceeds to the step 1107, in which all qualifying applications are suspended. In some embodiments, the mobile phone application is never suspended, allowing the user of the mobile phone to always place a call, such as an emergency call. In other words, in some embodiments, a "qualifying" application program is any program, other than the mobile phone application, with a numerical priority having a value larger than that of the testing application itself.

Next, in the step 1109, a question is repeatedly asked until it is answered correctly. In some embodiments, a user is given a hint to help him answer the question correctly. After the question is correctly answered, the process proceeds to the step 1111, in which all applications that were suspended are resumed. In the step 1113, the suspension flag is cleared. The process then proceeds to the step 1115, in which it ends.

In accordance with a first embodiment, though other application programs are suspended when a suspension criterion is met, a mobile phone application program is able to make telephone calls to and receive telephone calls from ("connect to") any telephone number. In accordance with a second embodiment, when a suspension criterion is met, a mobile phone application is able to connect to only specific telephone numbers. For example, telephone calls can be connected to only a parent, the police (e.g., a "911" call), paramedics, and towing services. In this embodiment, these "allowed" telephone numbers are stored in a list that is maintained by a parent or other testing administrator. In accordance with a third embodiment, when a suspension criterion is met, a mobile phone is allowed to connect to any telephone number except certain specified ones. For example, the mobile phone is able to connect to any telephone number except those of a boyfriend or anyone in a group of selected friends. These "disallowed" telephone numbers are stored in a list also maintained by a parent or other testing administrator.

In a fourth embodiment, a mobile phone application is able to connect to telephone numbers only if a predetermined emergency code is entered, on either the mobile phone itself (for outgoing calls) or on the phone of the calling party (for incoming calls). In this fourth embodiment, those telephone calls identified as emergency calls are logged so that a parent can later determine whether they were legitimate emergency calls or whether the emergency code was entered only to circumvent the testing application. Parents finding abuse of this emergency feature can suspend telephone privileges or take other disciplinary actions.

Figure 13:
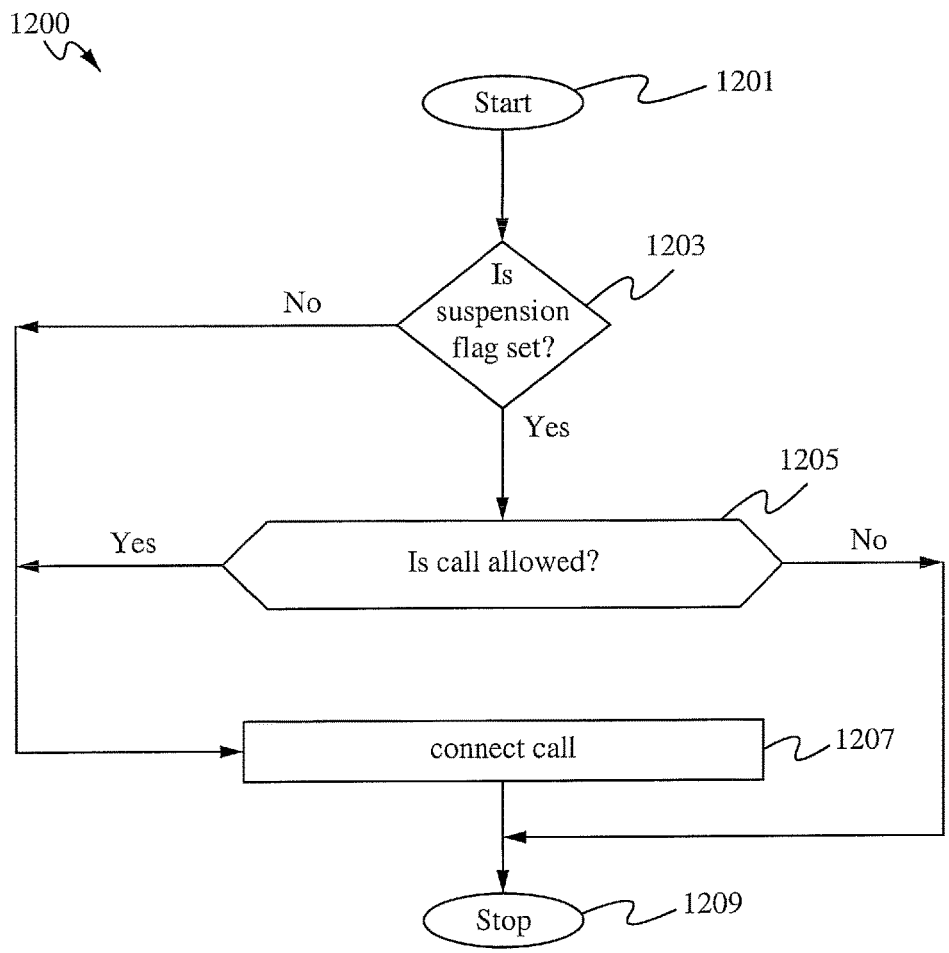
FIG. 13 shows the steps of a process for blocking selected calls on a mobile device when a suspension criterion is met in accordance with one embodiment.

While FIG. 12 shows the steps of a process for suspending applications other than a mobile phone, FIG. 13 shows the steps of a process 1200 performed when the mobile phone application is accessed, that is, when a user attempts to make or receive a call using the mobile telephone while other applications on the mobile telephone are suspended. As one example, the process 1200 is performed when a user presses a "Place call" button on a mobile phone and then enters an outgoing telephone number. In some embodiments, the processes shown in FIGS. 12 and 13 are all separately executing modules that form part of a testing application.

Referring to FIG. 13, the process starts in the step 1201, in which any parameters are initialized. Next, in the step 1203, the process determines whether the suspension flag (e.g., set in the step 1103 in FIG. 12) is set. If the suspension flag is set, the process proceeds to the step 1205; otherwise, the process proceeds to the step 1207, in which the call is connected, and then continues to the step 1209, in which the process ends. In the step 1205, the process determines whether the call is an allowed call; that is, whether the telephone number of the incoming or outgoing call is on an allowed list (e.g., FIG. 14A), is not on a blocked list (e.g., FIG. 14B), or has been combined with an emergency code that has been entered on the mobile phone for outgoing calls or entered on a remote phone for incoming calls (e.g., FIG. 14C). If the call is allowed, the process proceeds to the step 1207, in which the call is connected; otherwise, the process proceeds to the step 1209, in which it ends.

As explained above, a call is identified as an "allowed" call in many ways in accordance with the embodiments. For example, a call is allowed if it is on an a list of allowed telephone numbers (an "allowed list"), if it is not on a list of disallowed numbers (a "disallowed" or "blocked" list), or is combined with an emergency code before or after a telephone number is dialed. In some embodiments, the allowed list, disallowed list, or emergency code is stored on or is otherwise accessible to the testing application executing on the mobile phone.

As with all figures in this application, FIGS. 12 and 13 each show only illustrative steps. One skilled in the art will recognize that some of the steps can be deleted and others can be added; furthermore, the steps can be performed in orders different from that shown.

Suspension Criteria

Many different suspension criteria are able to be used in accordance with embodiments. As some examples, executing applications on a mobile device are suspended and others are blocked from executing when the number of calls or connections (incoming, outgoing, or both) made using the mobile phone over a predetermined period of time (referred to as the "allotment period") exceed a first predetermined threshold (e.g., 50), the duration of calls over the allotment period exceed a second predetermined threshold (e.g., 3 hours), the total cost of calls over the allotment period exceed a third predetermined threshold (e.g., $50.00). The suspension criterion can also be a combination of separate criterion: For example, the suspension criterion is met when the duration of calls over a week is 1 hour and the cost of all calls over a week is $10.00. Those skilled in the art will recognize that suspension criteria can be combined in many ways to form a single suspension criterion.

Figure 14:
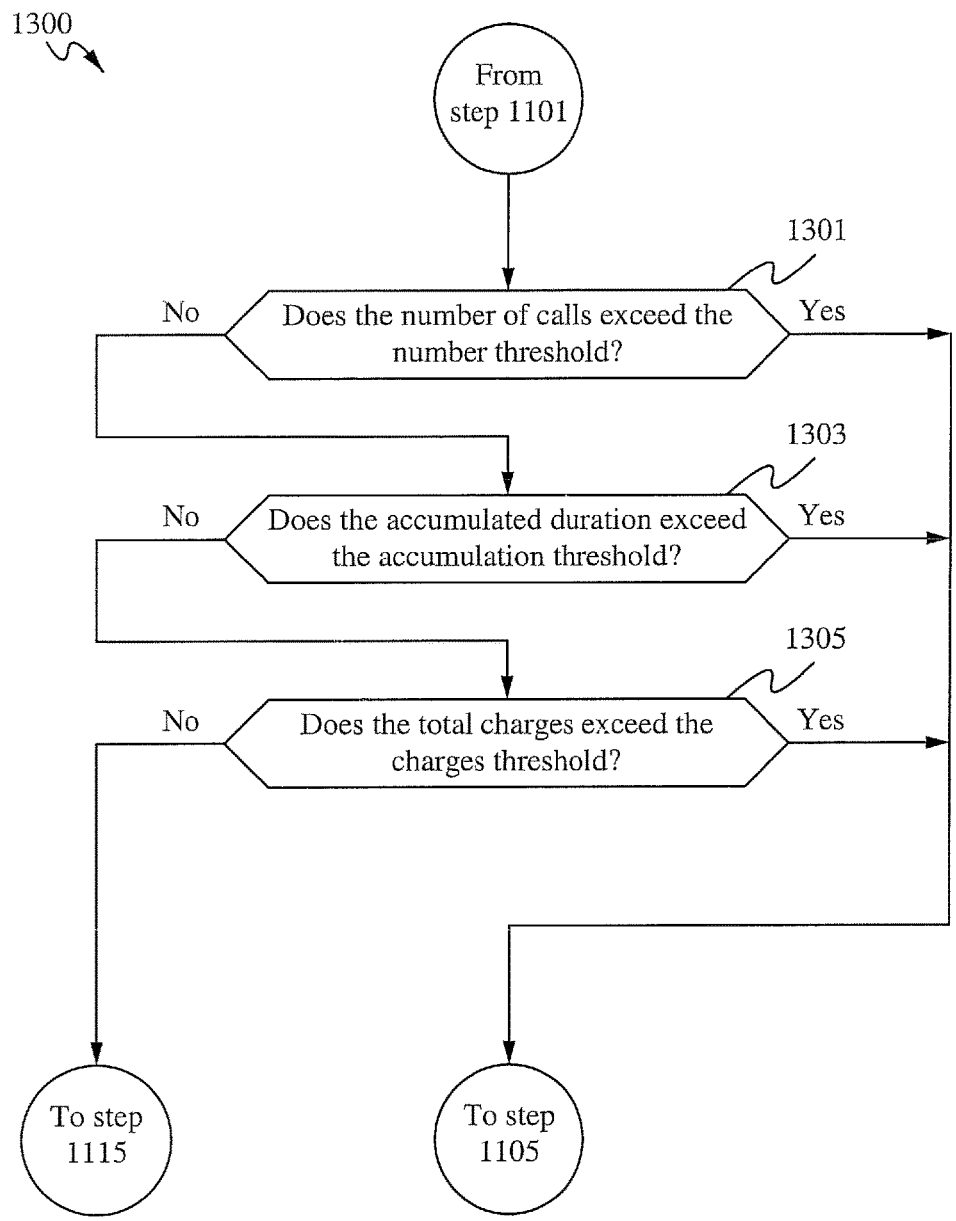
FIG. 14 shows the steps of a process for determining when a suspension criterion is met, in accordance with one embodiment.

FIG. 14 shows the steps of a process 1300 for determining whether a suspension criterion has been met according to one embodiment. In one embodiment, the process 1300 conforms to the step 1103 in FIG. 12. In this embodiment, the suspension criterion is that any one of three separate suspension criterion is met, the allotment period is one week, the first predetermined threshold is 10 calls, the second predetermined threshold is 3 hours, and the third predetermined threshold is $20.00

The process 1300 begins in the step 1301, after the step 1101 (FIG. 12) has been performed. In the step 1301, the process determines whether the number of calls for the week exceeds 10 (the first threshold). If the number exceeds 10, then the process proceeds to the step 1105 (FIG. 12); otherwise, the process proceeds to the step 1303. In the step 1303, the process determines whether the total duration of all calls for the week exceeds 3 hours (the second threshold). If the total duration exceeds 3 hours, then the process proceeds to the step 1105 (FIG. 12); otherwise, the process proceeds to the step 1305. In the step 1305, the process determines whether the total charges for the week exceeds $20.00 (the third threshold). If the total charges exceeds $20.00, then the process proceeds to the step 1105 (FIG. 12); otherwise, the process proceeds to the step 1115 (FIG. 12).

The process 1300 uses three different suspension parameters (number of calls, duration of calls, and cost of calls, all over a week) to determine whether a suspension criterion is met. It will be appreciated that any subset of the three parameters, as well as combinations of other parameters, can be used to determine a suspension criterion.

In accordance with one embodiment, the suspension parameters are able to be calculated on the electronic device itself. Alternatively, the suspension parameters are calculated or otherwise tracked on a remote host, such as one used by a cell phone service provider. In this embodiment, the suspension parameters are retrieved from the remote host before the step 1103 in FIG. 12.

Emergency Calls

As explained above, in one embodiment, when a suspension criterion is met, a user is still able to make or receive calls on a mobile phone, but only if an emergency code is entered on the mobile phone or by an outside caller trying to connect to the mobile phone. In one embodiment, the mobile phone user is asked to identify an outgoing call as an emergency call by pressing an alphanumeric key (e.g., the "#" key) or a predetermined sequence of keys (e.g., "911" or some secret code) before or after dialing the telephone number. All emergency calls are automatically logged (e.g., telephone number, time of day the call is placed, and duration of the call) so that a parent or other supervising adult can later verify that a call truly was for an emergency and was not just identified as one merely to circumvent a testing program in accordance with the embodiments.

FIG. 15 shows an emergency phone log 1350 in accordance with one embodiment. The log 1350 is available to the parent from, for example, a GUI (not shown). The log 1350 shows both outgoing and incoming calls, including the date of the call, the time of the call, the number to which the outgoing call was made or from which the incoming call was made, the name of the other party (if known), and the duration of the call.

While FIG. 15 shows information used to help determine whether a call was truly for an emergency, it will be appreciated that more, less, or different information can be used instead.

In some embodiments, an emergency log is available from a remote host, such as one provided by a mobile phone service provider. A parent or other testing administrator is able to log onto the remote host using a user name and password combination to access the emergency log.

Configuration Parameters

Figure 16:
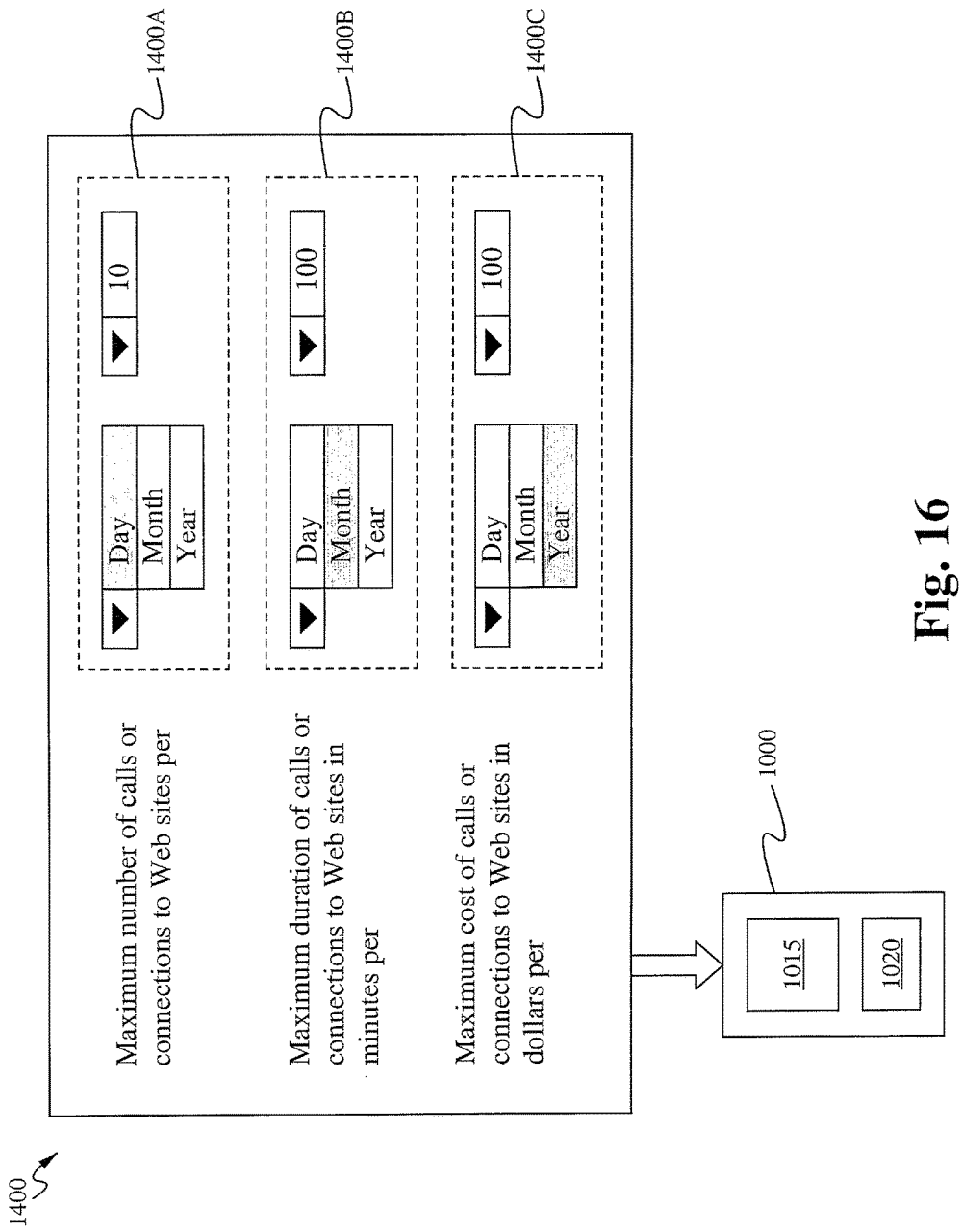
FIG. 16 illustrates a user interface for setting suspension parameters for a cell phone according to one embodiment.

FIG. 16 illustrates a portion of a Configuration GUI 1400 used to set suspension parameters for the mobile phone 1000 (FIGS. 11A-E) in accordance with the embodiments. The GUI 1400 contains blocks 1400A-C. As illustrated in FIG. 16, a user of the mobile phone 1000 is allowed a maximum of 10 calls per day (1400A), 100 minutes of call connections per month (1400B), and $100 of total charges for the year (1400C). Whenever any of these individual (component) suspension criterion is met, the system suspension criterion is met. It will be appreciated that other combinations of suspension parameters and corresponding values are able to be selected using the GUI 1400.

In some embodiments, after the suspension parameters are selected using the GUI 1400, they are downloaded to the mobile phone 1000, wirelessly, by docking the mobile phone into a communication port, or by other means.

As shown in FIG. 16, the GUI 1400 can also be used to configure an electronic device other than a mobile phone, such as one that connects to Web sites. As one example, the GUI 1400 can configure an electronic device to suspend applications when a predetermined number of connections to Web sites per day is reached (element 1400A), a predetermined duration of connections to Web sites (in minutes) per month is reached (element 1400B), a predetermined cost of connections to Web sites (in dollars) per month is reached (element 1400C), or any combination of these.

Configuring a Mobile Phone Application

Figure 17:
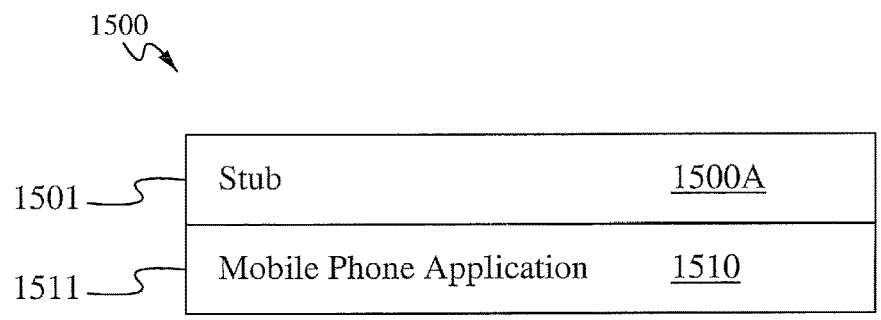
FIG. 17 shows an entry point for a modified mobile phone application program in accordance with one embodiment.

In one embodiment, a mobile phone application program is altered to allow the testing program to control use of the mobile phone application. FIG. 17 shows a modified mobile phone application program 1500. The original mobile phone application program 1510 (before modification) has an entry point 1511, the first instruction that was executed when the mobile phone application program 1510 was called by an operating system. When modified, the mobile phone application program 1500 is combined with a "stub" 1500A, such that the mobile phone application program 1500 has an entry point 1501. Now, when an operating system calls the mobile phone application program 1500, the stub 1500A is executed.

As one example, the stub 1500A performs the steps 1200 (FIG. 13), invoking the original mobile phone application program (entry point 1511) in the step 1207. Those skilled in the art will recognize other ways to tailor off-the-shelf mobile phone application programs in accordance with embodiments.

Hardware Configuration of Another Embodiment

Figure 18:
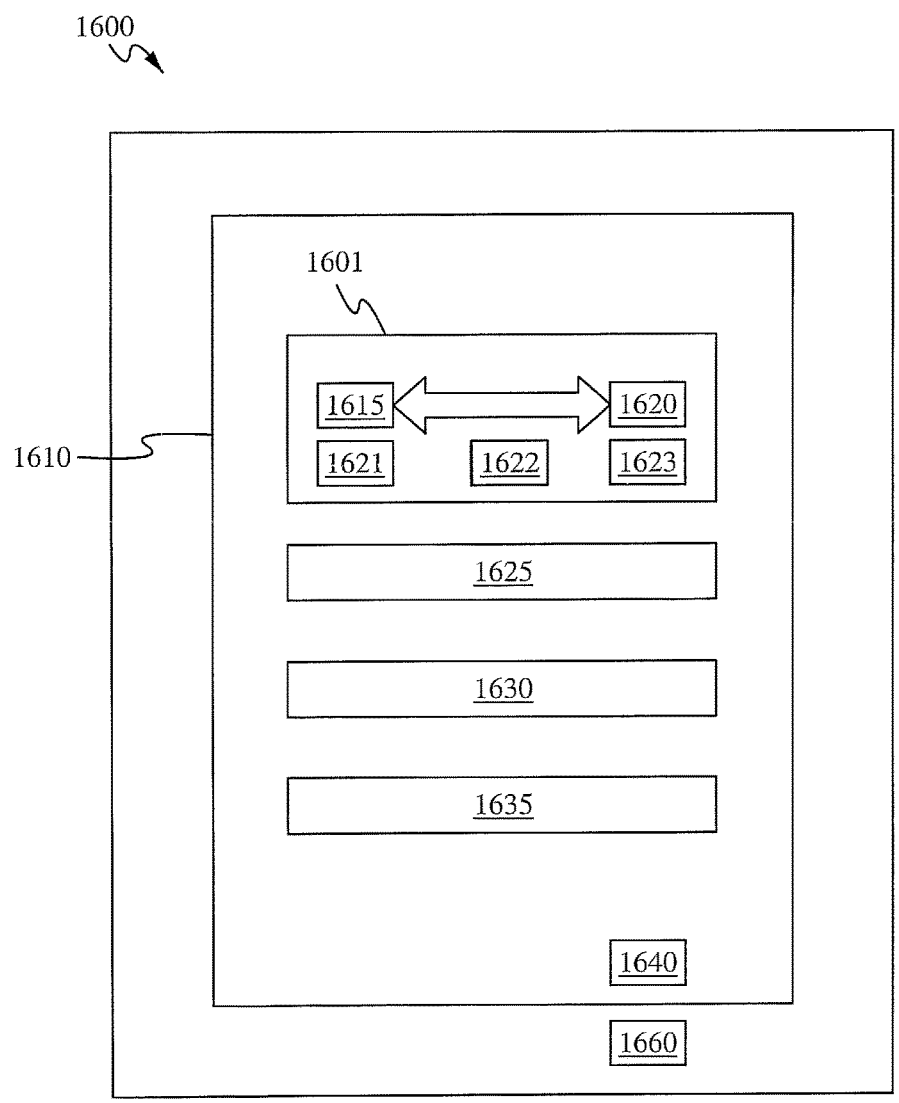
FIG. 18 shows the components of a mobile device for suspending application programs in accordance with a suspension criterion in accordance with one embodiment.

FIG. 18 is a block diagram of a mobile device 1600 in accordance with one embodiment. The mobile device 1600 comprises a memory 1610 and a processor 1660. The memory is a computer-readable medium that contains a testing application 1601, in accordance with embodiments, a mobile phone application program 1625, a game application program 1630, a Web browser program 1635, and a table 1640. The table 1640 has the same structure and use as the table 800 (FIG. 9), storing process identifiers and numerical priority values for the programs 1625, 1630, and 1635.

The testing application 1601 comprises a suspension-resumption module 1615, a database of question and answer pairs 1620 (similar to the database 400, FIG. 5), an allowed list 1621, a list of suspension thresholds 1622 (e.g., maximum allowed calls for the month, maximum duration of calls for the month, and maximum total cost incurred on the mobile phone), and a calculator 1623, for calculating and tracking the suspension parameters currently accrued for the allotment period.

In operation, when a user operates the mobile phone 1600, the testing application 1601 calls the suspension-resumption module 1601. In this example, the suspension criterion is that the total cost of calls for the allotment period (one month) does not exceed $100.00; the calculator 1623 has computed the total cost of calls for the month so far. The suspension-resumption module 1601 compares the cost of calls for the month with $100.00. The suspension criterion is met only if the cost is more than $100.00. If the suspension criterion has been met, the table 1640 is scanned to determine which applications (other than the mobile phone) have a numerical priority value larger than that of the testing application; all those applications with numerical priority values larger than that of the testing application are suspended.

If the user then accesses the mobile phone and enters a telephone number, the testing application determines whether the telephone number is on the allowed list 1521. If the telephone number is on the allowed list, the mobile phone application 1625 is able to connect to the outside call; otherwise, the mobile phone application 1625 is not able to connect the call. When the user answers a question presented (e.g., a resumption criterion is met), the testing application 1601 again scans the table 1640 and resumes those applications that were suspended.

Preferably, the calculator 1623 associates an area code of an outgoing call with a cost-per-minute rate, thereby allowing it to determine call charges. In some embodiments, the testing system periodically retrieves these cost-per-minute rates from databases maintained by mobile-phone service providers and stores them on mobile phone in a location accessible to the calculator.

It will be appreciated that in another embodiment, the allowed list 1621 is replaced with a blocked list, and a call is able to be connected only if the dialed telephone number is not on the blocked list. In still another embodiment, the call is connected only if the dialed number is preceded or followed by an emergency code. In this other embodiment, the call is logged.

While this example discusses outgoing calls, it will be appreciated that allowed lists, blocked lists, and emergency codes are able to be used to similarly block or allow incoming calls. Those skilled in the art will recognize that for incoming calls the caller telephone number and emergency code are available using caller-ID mechanisms.

While the embodiments describe that a mobile phone application program is never suspended, in accordance with other embodiments a mobile phone application program is suspended when a suspension criterion is met. Further, while embodiments discuss mobile devices, such as mobile telephones and text messengers, it will be appreciated that the invention is able to be used on non-mobile devices, for which usage information can be tracked, such as a desk-top or personal computers.

It will be appreciated that the educational tasks may include tasks other than answering questions. For example, the educational task may require editing a sentence to correct grammar errors. It may require deleting words from a sentence to make the sentence more concise. Or it may require other tasks that facilitate a student's memorization and learning of information.

It will be readily apparent to one skilled in the art that other various modifications may be made to the embodiments without departing from the spirit and scope of the invention as defined by the appended claims.

We claim:

1. A wireless device configured to test a user on an educational task, comprising:
   one or more non-testing, non-educational application programs having corresponding one or more first numerical priorities; and
   a hardware module comprising a testing application program independent from the non-testing, non-educational application and having a corresponding second numerical priority, wherein the testing application program suspends the one or more non-testing, non-educational application programs based on values of the one or more first numerical priorities and the second numerical priority when a suspension criterion is met, wherein the suspension criterion comprises a total cost incurred using the wireless device over a predetermined period of time exceeds a first predetermined threshold, wherein relative values of the one or more first numerical priorities and the second numerical priority indicate that the testing application has a higher execution priority than the one or more non-testing, non-educational application programs, and to resume the one or more non-testing, non-educational application programs when the educational task is performed on the wireless device, wherein resuming the one or more non-testing, non-educational application programs resumes at a point the one or more non-testing, non-educational application programs were suspended or paused, wherein suspending the one or more non-testing, non-educational application programs includes sending a suspend signal to all user applications running on the wireless device.

2. The wireless device of claim 1, further comprising a memory structure that associates the one or more numerical priorities with the corresponding one or more non-testing, non-educational application programs.

3. The wireless device of claim 1, wherein the suspension criterion comprises an elapse of a predetermined period of time.

4. The wireless device of claim 1, wherein the suspension criterion comprises an elapse of a random period of time.

5. The wireless device of claim 1, wherein the suspension criterion further comprises a total duration of connections using the wireless device over a predetermined period of time exceeds a second predetermined threshold, a total number of connections using the wireless device over a predetermined period of time exceeds a third predetermined threshold, or any combination thereof.

6. The wireless device of claim 1, wherein the wireless device comprises a mobile phone application program.

7. The wireless device of claim 6, wherein the wireless device is configured to block calls to one or more predetermined telephone numbers when the suspension criterion is met.

8. The wireless device of claim 6, wherein the wireless device is configured to connect calls only to one or more predetermined telephone numbers when the suspension criterion is met.

9. The wireless device of claim 1, wherein the one or more non-testing, non-educational application programs comprise at least two application programs.

10. The wireless device of claim 1, further comprising an interface for changing values of the one or more numerical priorities.

11. A method of ensuring that a user performs an educational task on a wireless device comprising:
    executing one or more non-testing, non-educational application programs on the wireless device, wherein each of the one or more non-testing, non-educational application programs has a corresponding first numerical priority;
    suspending each of the one or more non-testing, non-educational application programs by a testing application independent from the non-testing, non-educational application and program having a second numerical priority based on values of the first numerical priorities and the second numerical priority when a suspension criterion is met, wherein relative values of the first numerical priorities and second numerical priority indicate that the testing application has a higher execution priority than the one or more non-testing, non-educational application programs, wherein the suspension criterion is set in a parameter saved in a configuration file that the one or more non-testing, non-educational application programs read when the one or more non-testing, non-educational application programs are first loaded, wherein the suspension criterion comprises a total cost incurred using the wireless device over a predetermined period of time exceeds a first predetermined threshold; and
    resuming the one or more non-testing, non-educational application programs when the educational task is performed on the wireless device, wherein resuming the one or more non-testing, non-educational application programs resumes at a point the one or more non-testing, non-educational application programs were suspended or paused, wherein suspending the one or more non-testing, non-educational application programs includes sending a suspend signal to all user applications running on the wireless device.

12. The method of claim 11, wherein the suspension criterion comprises a predetermined time interval has elapsed, a threshold cost has been accrued using the wireless device over a predetermined time period, a threshold duration of connections has been accrued using the wireless device over a predetermined time period, a threshold number of connections have been made using the wireless device over a predetermined time period, or any combination thereof.

13. The method of claim 12, further comprising connecting a telephone call between the wireless device and a remote device when the suspension criterion is met.

14. The method of claim 13, wherein the telephone call is connected only to one or more preselected telephone numbers.

15. The method of claim 12, further comprising blocking a telephone call between the wireless device and a remote device when the remote device is associated with a preselected telephone number.

16. A method of ensuring that a user performs an educational task on a wireless device comprising:

executing one or more non-testing, non-educational application programs on the wireless device, wherein each of the one or more non-testing, non-educational application programs has a corresponding first numerical priority;

executing a testing application program independent from the non-testing, non-educational application and on the wireless device, wherein the testing application program has a second numerical priority;

comparing a value of each of the first numerical priorities to a value of the second numerical priority to determine selected ones of the one or more non-testing, non-educational application programs that have a lower executing priority than the testing application program;

suspending, by a suspension program, execution of the selected ones of the one or more non-testing, non-educational application programs based on a suspension criterion until an educational task is performed on the wireless device, wherein the suspension criterion comprises a total cost incurred using the wireless device over a predetermined period of time exceeds a first predetermined threshold; and resuming the selected ones of the one or more non-testing, non-educational application programs, wherein resuming the selected ones of the one or more non-testing, non-educational application programs resumes at a point the selected ones of the one or more non-testing, non-educational application programs were suspended or paused, wherein suspending the selected ones of the one or more non-testing, non-educational application programs includes sending a suspend signal to the one or more non-testing, non educational application programs running on the wireless device.

17. The method of claim 16, wherein the suspension criterion comprises an elapse of a predetermined period of time.

18. The method of claim 16, wherein the suspension criterion comprises an elapse of a random period of time.

19. The method of claim 16, wherein the suspension criterion comprises a total duration of connections using the wireless device over a predetermined period of time exceeds a second predetermined threshold, a total number of connections using the wireless device over a predetermined period of time exceeds a third predetermined threshold, or any combination thereof.

* * * * *